(12) United States Patent
Takata et al.

(10) Patent No.: US 7,831,610 B2
(45) Date of Patent: Nov. 9, 2010

(54) CONTENTS RETRIEVAL DEVICE FOR RETRIEVING CONTENTS THAT USER WISHES TO VIEW FROM AMONG A PLURALITY OF CONTENTS

(75) Inventors: Kazutoyo Takata, Osaka (JP); Takashi Tsuzuki, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/521,926

(22) PCT Filed: Aug. 5, 2008

(86) PCT No.: PCT/JP2008/002111
§ 371 (c)(1),
(2), (4) Date: Jul. 1, 2009

(87) PCT Pub. No.: WO2009/019860
PCT Pub. Date: Feb. 12, 2009

(65) Prior Publication Data
US 2009/0300011 A1    Dec. 3, 2009

(30) Foreign Application Priority Data
Aug. 9, 2007    (JP) .............................. 2007-208274

(51) Int. Cl.
*G06F 7/00* (2006.01)
(52) U.S. Cl. ..................................................... 707/767
(58) Field of Classification Search ................. 707/767, 707/759, 765, 739
See application file for complete search history.

(56) References Cited

U.S. PATENT DOCUMENTS 5,905,980 A * 5/1999 Masuichi et al. ................... 1/1

(Continued)

FOREIGN PATENT DOCUMENTS

JP    10-134075    5/1998

(Continued)

OTHER PUBLICATIONS

G. Salton, A. Wong, C. S. Yang, A vector space model for automatic indexing, Communications of the ACM, v.18 n.11, p. 613-620, Nov. 1975.*

(Continued)

*Primary Examiner*—Robert Timblin
(74) *Attorney, Agent, or Firm*—Wenderoth, Lind & Ponack, L.L.P.

(57) ABSTRACT

A contents retrieval device (100) presenting an appropriate related keyword to a user even when an object user wishes to retrieve dynamically changes. The contents retrieval device (100) includes a contents estimation unit (107) retrieving contents according to a search keyword, a document space database (103) storing document spaces according to an occurrence frequency of the keyword, a document space selection unit (104) selecting a the narrowing-down document space and an expansion document space from the document space database (103) according to the search keyword and the occurrence frequency of the document space indicating a degree of relevance with the contents according to the search keyword, a related keyword estimation unit (108) selecting keywords corresponding to the narrowing-down document space and the expansion document space as a narrowing-down keyword and an expansion keyword, respectively, and an output unit displaying the selected narrowing-down and expansion keywords.

17 Claims, 14 Drawing Sheets

U.S. PATENT DOCUMENTS

| | | | |
|---|---|---|---|
| 6,138,116 A * | 10/2000 | Kitagawa et al. | 1/1 |
| 6,510,406 B1 * | 1/2003 | Marchisio | 704/9 |
| 6,847,966 B1 * | 1/2005 | Sommer et al. | 707/739 |
| 2003/0171914 A1 * | 9/2003 | Jung | 704/7 |
| 2004/0064438 A1 * | 4/2004 | Kostoff | 707/1 |
| 2005/0071365 A1 * | 3/2005 | Hou et al. | 707/102 |
| 2005/0154713 A1 * | 7/2005 | Glover et al. | 707/3 |
| 2005/0289128 A1 * | 12/2005 | Hamaguchi | 707/3 |
| 2006/0248060 A1 * | 11/2006 | Silverberg et al. | 707/3 |
| 2006/0271887 A1 * | 11/2006 | Bier et al. | 715/866 |

FOREIGN PATENT DOCUMENTS

| | | |
|---|---|---|
| JP | 2002-324077 | 11/2002 |

OTHER PUBLICATIONS

English translated JP 2002-324007.*

M. Murata, K. Uchimoto, H. Ozaku, Q. Ma, M. Utiyama, and H. Isahara. Japanese probabilistic information retrieval using location and category information. The Fifth International Workshop on Information Retrieval with Asian Languages, pp. 81-88, 2000.*

International Search Report issued Sep. 2, 2008 in International (PCT) Application No. PCT/JP2008/002111.

Japanese Office Action issued Aug. 25, 2009 in a Japanese Application No. 2009-526334 that is a foreign counterpart to the present application.

Yoko Nishihara et al., "Web Page no Nan'ido to Gakushu Junjo ni Motozuku Joho Rikai Shien System", The Transactions of the Institute of Electronics, Information and Communication Engineers, Sep. 1, 2006, vol. J89-D, No. 9, . p. 1966, right column, lines 29-37 (partial English document from <http://search.ieice.or.jp/bin/summary.php?id=j89-d_9__1963&category=D&lang=E&year=2006&abst=j)>.

Takenobu Tokunaga, "Information Retrieval and Language Processing," University of Tokyo Press 1999, pp. 32 and 33 (with partial English translation).

Kenji Kita et al., "Information Retrieval Algorithm", Kyoritsu Shuppan Co., Ltd., Jan. 2002, pp. 65-77 (with partial English translation).

Makoto Nagao et al., "Natural Language Processing", Iwanami Shoten, 1996, pp. 387-392 (with partial English translation).

* cited by examiner

FIG. 5

| Contents ID | Name of contents | Time | Keywords | Overview |
|---|---|---|---|---|
| 43 | South South | June 30, 2006 13:00 | South Information Gourmet Summer | ... |
| 68 | My Tama river | July 3, 2006 22:30 | Maruko bridge Baseball Snake Japanese killifish | ... |
| ... | ... | ... | ... | ... |

| Search step | Keywords | Keyword ID | Search mode flag |
|---|---|---|---|
| 1 | Hanako Matsushita | 10 | Early stage |
| 2 | Kyoto | 23 | Narrow down |
| 3 | Gourmet | 54 | Expand |
| ... | ... | ... | ... |

FIG. 9

|  | C1 | C2 | C3 | C4 | C5 |
|---|---|---|---|---|---|
| KW1b | 0.2 | 0.1 | 0.2 | 0.8 | 0.2 |
| KW2b | 0.3 | 0.1 | 0.3 | 0.2 | 0.8 |
| KW3b | 2 | 0.2 | 0.7 | 0.1 | 0.5 |
| KW4b | 0.8 | 0.8 | 0.2 | 0.4 | 0.2 |
| KW5b | 0.8 | 0.2 | 0.1 | 0.7 | 0.1 |

Contents ID (columns), Keyword ID (rows)

Space ID : 2

FIG. 14

$$\begin{array}{c} \text{Keyword ID} \\ \begin{array}{cc} & \begin{array}{ccccc} \text{KW1} & \text{KW2} & \text{KW3} & \text{KW4} & \text{KW5} \end{array} \\ \begin{array}{c} \text{KW1} \\ \text{KW2} \\ \text{KW3} \\ \text{KW4} \\ \text{KW5} \end{array} & \left( \begin{array}{ccccc} 0.2 & 0.1 & 0.2 & 0.8 & 0.2 \\ 0.3 & 0.1 & 0.4 & \underline{0.7} & \underline{0.8} \\ 2 & 0.2 & 0.7 & 0.1 & 0.5 \\ 0.8 & 0.8 & 0.2 & 0.4 & 0.2 \\ 0.8 & 0.2 & 0.1 & 0.7 & 0.1 \end{array} \right) \end{array} \end{array}$$

(KW2 circled on left axis; Keyword ID label on vertical axis)

FIG. 15

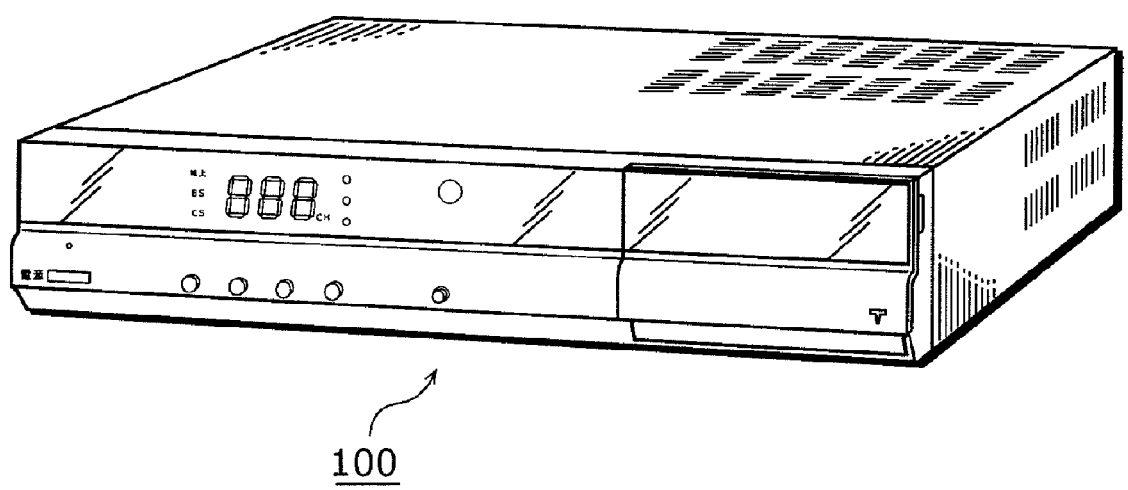

100

CONTENTS RETRIEVAL DEVICE FOR RETRIEVING CONTENTS THAT USER WISHES TO VIEW FROM AMONG A PLURALITY OF CONTENTS

BACKGROUND OF THE INVENTION

1. Field of Invention

The present invention relates to a contents retrieval device for retrieving contents that the user wishes to view from among a plurality of contents.

2. Description of the Related Art

Conventionally, as a retrieval method for retrieving the contents that the user wishes to view from among the large amount contents stored in a server and others, there are many methods for generating a list of contents that match a search keyword input by the user, and presenting the list of contents. These methods are effective for a user who can clearly determine an appropriate search keyword that is necessary to receive the desired contents, and who can assume/understand the contents to be retrieved.

However, a user who cannot come up with a keyword which represents the contents to be retrieved cannot input a search keyword. For this reason, the user cannot retrieve the contents using this method. This often happens when retrieving entertainment contents such as TV programs, music, and movies.

In response to the problem, there has been reported another type of contents retrieval technology where multiple keywords are presented by the system, and the user repeats a selection of keywords that they are interested in to narrow down the contents, achieving retrieval of desired contents interactively (see, for example, Patent Reference 1).

The contents retrieval device according to Patent Reference 1 (document processing device) acquires search a condition together with the search keyword when starting a search, and presents a related keyword related to the search keyword by limiting the search area. This device achieves presentation of the related keywords which facilitates narrowing down the contents by narrowing down the search area when starting the search. Therefore, the user can retrieve the desired contents only by repeating the selection of the related keywords presented by the content retrieval device. This method is effective for a user who is not sure of the keyword representing the contents to be retrieved.

[Patent Reference 1] Japanese Unexamined Patent Application Publication No. H10-134075.

BRIEF SUMMARY OF THE INVENTION

However, with the contents retrieval device disclosed in Patent Reference 1, there is a problem that the related keyword for retrieving the desired contents cannot be presented when the user's search object is not clearly determined when starting the search, and when the content the user wishes to view dynamically changes during the search.

More specifically, the contents retrieval device according to the Patent Reference 1 can only perform the narrowing-down search from a certain perspective in a series of search. For this reason, when the contents the user wishes to retrieve dynamically changes and the user tries to view various kinds of contents, it is necessary to return to the search start screen in order to perform a search from a different perspective. This increases the user's load upon search.

For example, in the contents retrieval device according to the Patent Reference 1, the user who does not have a clear search object and the contents the user wishes to view dynamically changes cannot select between a search mode where the various kinds of contents from a different perspective is retrieved through interaction (expansion search mode) and a search mode where the contents displayed as the search result is further narrowed down (narrowing-down search mode).

The present invention is conceived in response to this problem, and it is an object of the present invention to provide a contents retrieval device which can present a related keyword for retrieving a desired contents to a user, even when the contents that the user searches for dynamically changes.

In order to achieve the abovementioned object, the contents retrieval device according to the present invention is a contents retrieval device which displays a related keyword related to a search keyword used for retrieving contents based on a contents database in which each of a plurality of contents is stored with a plurality of keywords, the contents retrieval device comprising: a keyword acquisition unit which acquires the search keyword; a content retrieval unit which retrieves the contents according to the search keyword from the contents database; a document space storage unit in which document space information is stored, the document space information indicating a degree of relevance between each contents and each keyword, and the document space information being categorized according to an occurrence frequency indicating occurrence of each keyword included in the contents database appears, with respect to each contents in the contents database; a document space selection unit which selects (i) second document space information including the keyword used for narrowing down the number of contents to be retrieved and (ii) third document space information used for expanding the number of contents to be retrieved, according to a magnitude relationship of the occurrence frequency of the document space information stored in said document space storage unit, using, as a basis, an occurrence frequency of the keyword in first document space information which indicates a degree of relevance between the search keyword and contents according to the search keyword; and a display unit which displays each of keywords which satisfies a predetermined standard in the second document space information and the third document space information selected by the document space selection unit, as the related keyword.

Furthermore, in order to achieve the abovementioned object, the contents retrieval device according to the present invention is a contents retrieval device which displays a related keyword related to a search keyword used for retrieving contents based on a contents database in which each of a plurality of contents is stored with a plurality of keywords, the contents retrieval device including: a keyword acquisition unit which acquires the search keyword; a content retrieval unit which retrieves the contents according to the search keyword from the contents database; a document space storage unit in which document space information is stored, the document space information indicating a degree of relevance between each contents and each keyword, for each segment categorized according to an occurrence frequency indicating occurrence of each keyword included in the contents database appears, with respect to each contents in the contents database; a document space selection unit which selects second document space information from the document space storage unit according to an occurrence frequency of first document space information which indicates a degree of relevance between the search keyword and contents according to the search keyword; and a display unit which displays a keyword which satisfies a predetermined standard in the second document space information selected by the document space selection unit, as the related keyword.

This allows the related keyword for retrieving the user's desired contents to be presented, even when the contents that the user searches for dynamically changes.

For example, the document space selection unit includes a first document space selection unit which selects, as narrowing-down document space information, second document space information corresponding to the occurrence frequency less than the occurrence frequency of the first document space information, from the document space storage unit, and the display unit which displays a keyword which satisfies a predetermined standard in the narrowing-down space information as the related keyword. Furthermore, the document space selection information includes a second document space selection unit which selects, as expansion document space information, second document space information corresponding to an occurrence frequency which is equal to or more than the occurrence frequency of the first document space information from the document space storage unit, and the display unit is configured to display, as the related keyword, (i) a narrowing-down keyword which is the keyword that satisfies the predetermined standard in the narrowing-down document space and (ii) an expansion keyword which is a keyword that satisfies a predetermined standard in the expansion space information. Still further, the contents retrieval device further includes a related keyword selection unit which selects, from the contents database, the narrowing-down keyword and the expansion keyword respectively corresponding to the narrowing-down document space information and the expansion document space information such that a keyword indicating a larger degree of relevance to the contents retrieved by the contents retrieval unit is more likely selected, in which the display unit displays the narrowing-down keyword and the expansion keyword as the related keyword, and to display an attribute of the contents retrieved by the contents retrieval unit.

More specifically, the document space information where the keywords with a large occurrence frequency belong to, the document space information where the keywords with a medium occurrence frequency belong to, and the document space information where the keywords with a small occurrence frequency belong to are stored in the document space storage unit.

With this, the document space information corresponding to the occurrence frequency smaller than the occurrence frequency of the document space information corresponding to the search keyword is selected as the narrowing-down document space information. For example, when the occurrence frequency of the search keyword is medium, the document frequency information where the keywords with a small occurrence frequency belong to is selected as the narrowing-down document space information. Subsequently, the keywords having a large degree of relevance by the narrowing-down document space information with the contents retrieved by the contents retrieval unit are displayed as the narrowing-down keywords.

As a result, the keywords having an occurrence frequency smaller than the occurrence frequency of the search keyword are displayed as the narrowing-down keywords. Thus, when the user selects the narrowing-down keyword as a new search keyword, the content retrieval unit can appropriately narrow down the contents that the user wishes to view from among the plurality of contents that has been retrieved and displayed.

Furthermore, the document space information corresponding to the occurrence frequency equal to or higher than the occurrence frequency of the document space information corresponding to the search keyword is selected as the expansion document space information. For example, when the occurrence frequency of the search keyword is medium, the document space information where the keywords with the medium occurrence frequency belong to and the document space where the keywords with a large occurrence frequency belong to are selected as the expansion document space information. Subsequently, the keywords having a large degree of relevance by the expansion document space information with the contents retrieved by the contents retrieval unit are displayed as the narrowing-down keywords.

As a result, they keywords with the occurrence frequency equal to or higher than the occurrence frequency of the search keyword are selected as the expansion keyword. Accordingly, when the user selects the expansion keyword as a new search keyword, the contents related to the search keywords equal to or more than the number of contents that have been retrieved and displayed are appropriately retrieved.

Thus, the narrowing-down keywords and the expansion keywords are simultaneously displayed as the related keywords. Therefore, even when the contents that the user searches for dynamically changes, the user can retrieve the desired contents by selecting either the narrowing-down keyword or the expansion keyword, without returning to the search start screen as in the conventional example.

More specifically, in the conventional example, the related keywords related to the search keyword are simply sequentially displayed in the order of high degree of relevance, without any distinction between the related keywords suitable for narrowing down the plurality of contents that has been retrieved before (narrowing-down keywords) and the related keywords suitable for performing a new search in a perspective different from that of the search keyword (expansion keyword). As a result, there are cases where the narrowing-down keywords are not displayed or where the expansion keywords are not displayed. Consequently, a search for narrowing down the plurality of contents with the keywords is performed, even when the keyword is not a narrowing-down keyword.

In the present invention, as described above, the narrowing-down keywords and the expansion keywords are appropriately distinguished according to the occurrence frequency and simultaneously displayed. Thus, the user can easily and appropriately retrieve the desired contents.

Furthermore, the contents retrieval device may further include: a search condition determining unit which determines (i) that the narrowing-search is performed by the contents retrieval unit when the keyword acquisition unit acquires the narrowing-down keyword by the user's selection of the narrowing-down keyword displayed by the display unit, and (ii) that the expansion search should be performed when the keyword acquisition unit acquires the expansion keyword as the search keyword by a user's selection of the expansion keyword displayed by the display unit, and to retrieve the contents according to the search keyword and the other keywords acquired by the keyword acquisition unit before the search keyword; and a ratio determining unit which determines a ratio of the number of the narrowing-down keyword and the number of the expansion keyword to be displayed by the display unit, according to a result determined by the search condition determining unit, in which the related keyword selection unit selects the narrowing-down keyword and the expansion keyword which are according to the ratio determined by the ratio determining unit in number. For example, the ratio determining unit determines a ratio where the number of the narrowing-down keyword is larger than the number of the expansion keyword when the search condition determining unit determines that the narrowing-down search is performed. Furthermore, the ratio determining unit determines a ratio where the number of the expansion keyword is larger than the number of the narrowing-down keyword when the search condition determining unit determines that the expansion search is performed.

With this, when the user selects a narrowing-down keyword displayed on the display unit as a next new search keyword, the new narrowing-down keywords related to the new search keywords are displayed with the contents according to the new search keyword, and the number of the new narrowing-down keywords is more than the expansion keywords. Accordingly, it is possible to improve the usability for the user, since many narrowing-down keywords are displayed for the user who is trying to perform a narrowing-down search. Similarly, when the user selects an expansion keyword displayed on the display unit as a next new search keyword, the new expansion keywords related to the new search keywords are displayed with the contents according to the new search keyword, and the number of the new expansion keywords is more than the narrowing-down keywords. Accordingly, it is possible to improve the usability for the user, since many expansion keywords are displayed for the user who is trying to perform an expansion search.

Note that, the present invention may not only be realized as the contents retrieval device, but also as a method for retrieving the contents with the device, a program causing the device to retrieve the contents, a computer-readable recording medium in which the program is stored, and an integrated circuit.

The contents retrieval device according to present invention produces an effect in presenting the related keyword for retrieving the desired contents of a user, even when the contents that the user searches for dynamically changes.

BRIEF DESCRIPTION OF DRAWINGS

FIG. 5 is an example of a plurality of contents attribute information accumulated in the contents database according to the embodiment of the present invention.

FIG. 7 is a diagram showing information stored in the keyword storage unit according to the embodiment of the present invention.

FIG. 9 is an explanatory diagram for explaining the operation of the related keyword estimation unit according to the embodiment of the present invention for specifying candidates for related keywords.

FIG. 14 is a diagram showing an example of the associative dictionary according to the embodiment of the present invention.

FIG. 15 is a diagram showing an example of the overview of the contents retrieval device according to the embodiment of the present invention.

NUMERICAL REFERENCES

Figure 1:
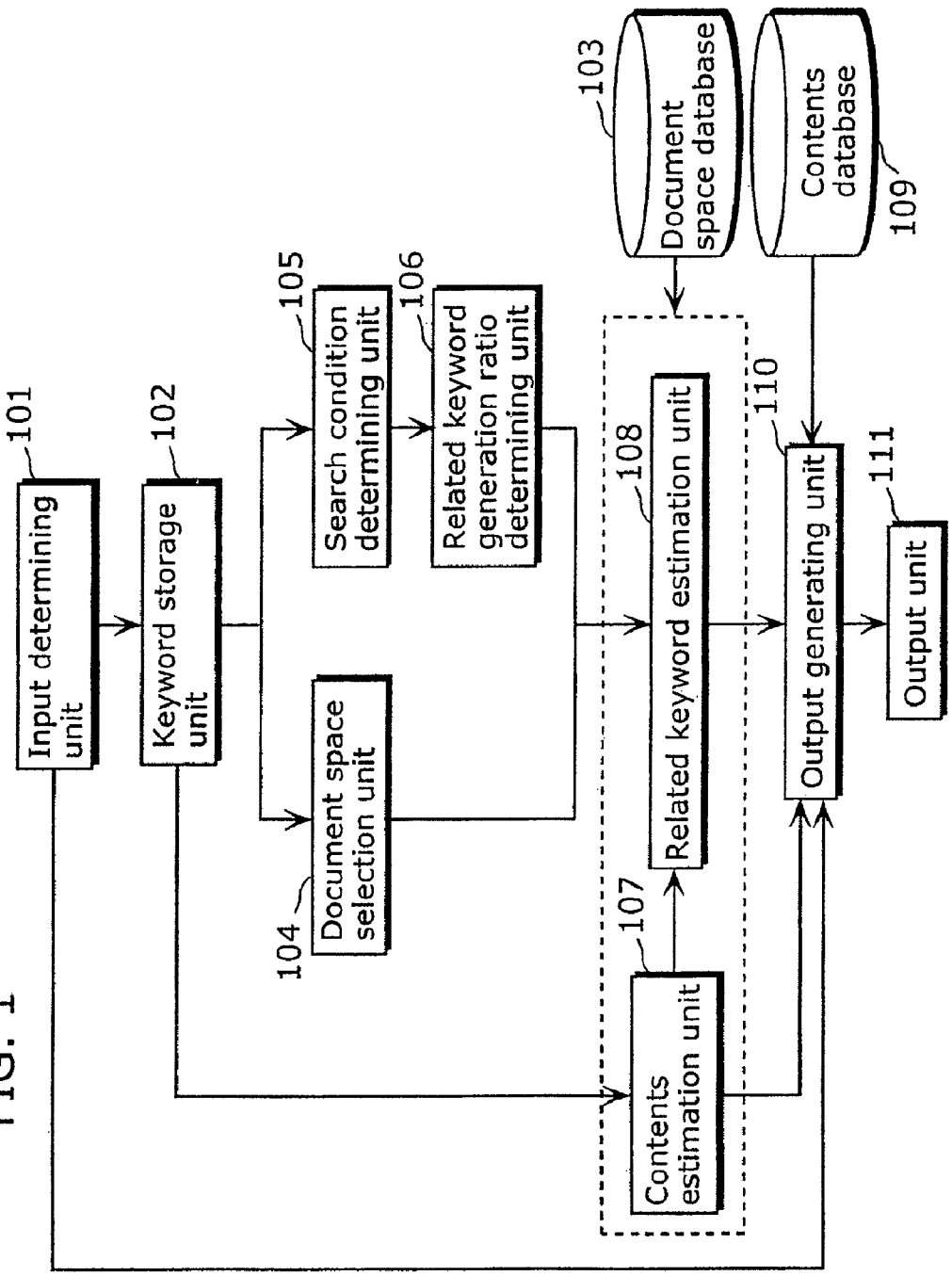
FIG. 1 is a block diagram showing the configuration of the contents retrieval device according to an embodiment of the present invention.

100 Contents retrieval device
101 Input determining unit
102 Keyword storage unit
103 Document space database
104 Document space selection unit
105 Search condition determining unit
106 Related keyword generation ratio determining unit
107 Contents estimation unit
108 Related keyword estimation unit
109 Contents database
110 Output generating unit
111 Output unit

DETAILED DESCRIPTION OF THE INVENTION

The contents retrieval device according to the embodiment of the present invention will be described with reference to the drawings. Note that, in this embodiment, the contents retrieval device, which retrieves contents to be viewed by a user, is, for example, a server where contents are television programs from the past to the present.

FIG. 1 is a block diagram showing the configuration of the contents retrieval device according to this embodiment.

The contents retrieval device 100 according to this embodiment can present, even when the contents which the user is searching for changes dynamically, related keywords for retrieving the desired contents to the user, and the contents retrieval device 100 includes an input determining unit 101, a keyword storage unit 102, a document space database 103, a document space selection unit 104, a search condition determining unit 105, a related keyword generation ratio determining unit 106, a contents estimation unit 107, a related keyword estimation unit 108, a contents database 109, an output generating unit 110, and an output unit 111.

The input determining unit 101 receives an option selected by an operation of the user, out of a plurality of options displayed on the output unit 111 (hereinafter referred to as the input option), and determines whether the input option indicates a keyword or contents. The input determining unit 101 outputs the input selection to the keyword storage unit 102 when the input determining unit 101 determines that the input option indicates the keyword. The input determining unit 101 outputs the input selection to the output generating unit 110 when the input determining unit 101 determines that the input option indicates the contents. Here, when the input selection that has been recently received by the input determining unit 101 indicates the keyword, the keyword shall be referred to as a search keyword hereafter.

The keyword storage unit 102 includes an area for storing the keyword indicated by the input option that has been output from the input determining unit 101.

The search condition determining unit 105 determines whether the mode of search determined by the search keyword stored in the keyword storage unit 102 (the search mode) is a narrowing-down mode or an expansion mode. Here, the narrowing down mode is a mode where a search for narrowing down the contents using a combination of the search keyword and the keywords that have been input after the start of the search to the present (narrowing-down search). On the other hand, the expansion mode is a mode where only the contents matched the search keyword is retrieved regardless of the past keywords (expansion search).

The related keyword generation ratio determining unit 106 determines the ratio of the number of narrowing-down keywords and the number of the expansion keywords to be displayed (display ratio) according to the result determined by the search condition determining unit 105. The narrowing-down keyword is a keyword that can be a next search keyword for executing the narrowing-down search, and is a keyword for further dividing and narrowing-down the contents searched with the keywords that have been input in the past. On the other hand, the expansion keyword is a keyword that can be a next search keyword for executing the expansion search, is a new keyword that is highly relevant to the keywords that have been input in the past, and is a keyword for retrieving the contents again. Furthermore, the narrowing-down keywords and the expansion keywords are collectively referred to as related keywords.

The contents database 109 sequentially stores the plurality of contents such as broadcast television programs. Here, the contents include contents data which indicates a moving picture and audio of the television program, and contents attribute information which indicates attributes of the television program such as the EPG information of the television program.

The document space database 103 stores a plurality of documents spaces each of which indicates a relationship between each of the contents indicated in the contents database 109 and each keyword. Note that the plurality of document spaces stored in the document space database 103 is identified with the space ID.

The document space selection unit 104 selects, from among the document space database 103, a document space that should be used for estimating the narrowing-down keyword (hereinafter referred to as a narrowing-down document space) and a document space that should be used for estimating the expansion keyword (hereinafter referred to as a expansion document space). Subsequently, the document space selection unit 104 outputs the space ID of the selected narrowing-down document space and the space ID of the selected expansion document space to the related keyword estimation unit 108.

The contents estimation unit 107 estimates the contents related to the search keyword using the keywords stored in the keyword storage unit 102 and the plurality of document spaces stored in the document space database 103. Subsequently, the contents estimation unit 107 outputs the contents ID for identifying the estimated contents to the related keyword estimation unit 108 and the output generating unit 110.

The related keyword estimation 108 acquires the contents ID output from the contents estimation unit 107, the ratio determined by the related keyword generation ratio determining unit 106, and the space ID output from the document space selection unit 104, and estimates the narrowing-down keywords and the expansion keywords as the related keywords using the contents ID, the ratio, the space ID and the document space database 103. The related keyword estimation unit 108 outputs the keyword ID for identifying the estimated related keyword to the output generating unit 110.

When the output generating unit 110 acquires the input option indicating the contents from the input determining unit 101, the output generating unit 110 extracts the contents data according to the input option from the contents database 109 and outputs the contents data to the output unit 111.

Furthermore, when the output generating unit 110 acquires the contents ID from the contents estimation unit 107 and the keyword ID from the related keyword estimation unit 108, the output generating unit 110 extracts the contents attribute information corresponding to the contents ID and the related keyword corresponding to the keyword ID from the contents database 109. Subsequently, the output generating unit 110 outputs the search result information including the contents attribute information and the related keyword to the output unit 111.

The output unit 111 includes a liquid crystal display, for example, and when the contents data from the output generating unit 110 is received, the output unit 111 reproduces the contents data. On the other hand, when the output unit 111 acquires the search result information from the output generating unit 110, the output unit 110 displays the contents indicated by the search result information.

Note that, in this embodiment, the input determining unit 101 is configured as a keyword acquisition unit which acquires the search keyword, the contents estimation unit 107 is configured as the contents retrieval unit which retrieves the contents according to the search keyword from the contents database 109, the output unit 111 is configured as the display unit which displays the narrowing-down keyword and the expansion keyword estimated by the related keyword estimation unit 108 as the related keyword, and displays the attribute of the contents estimated by the contents estimation unit 107.

Here, the total operation of the contents retrieval device 100 will be described with reference to the screen displayed on the contents retrieval device 100.

Figure 2:
FIG. 2 is a diagram showing an example screen displayed by the contents retrieval device when starting a search.

FIG. 2 is an example screen displayed by the contents retrieval device 100 when starting a search.

For example, the contents retrieval device 100 displays the initial search screen on the output unit 111 when starting the search. In this initial search screen, "Hanako Matsushita", "Japan", and "basketball" and others are displayed as the initial search keywords which are the options. In this case, the output generating unit 110 displays, for example, the predetermined words such as "Hanako Matsushita", and "Japan" on the output unit 111 as the initial search keywords. Note that, the output generating unit 110 may display the words indicating a general genre such as "sports" and "documentary" as the initial search keywords. Furthermore, the output generating unit 110 may display, on the output unit 111, the words included in the contents attribute information of the contents which is frequently viewed by the user as the initial search keywords, using the history of the contents data output to the output unit 111, more specifically, the user's viewing history.

Here, the user selects, for example, the initial search keyword "Hanako Matsushita" which is the option displayed on the initial search screen on the output unit 111. As a result, the contents retrieval device 100 displays the contents of the search result information including the contents attribute information related to the initial search keyword "Hanako Matsushita" and the keywords related to the initial search keyword "Hanako Matsushita" (related keywords).

Figure 3:
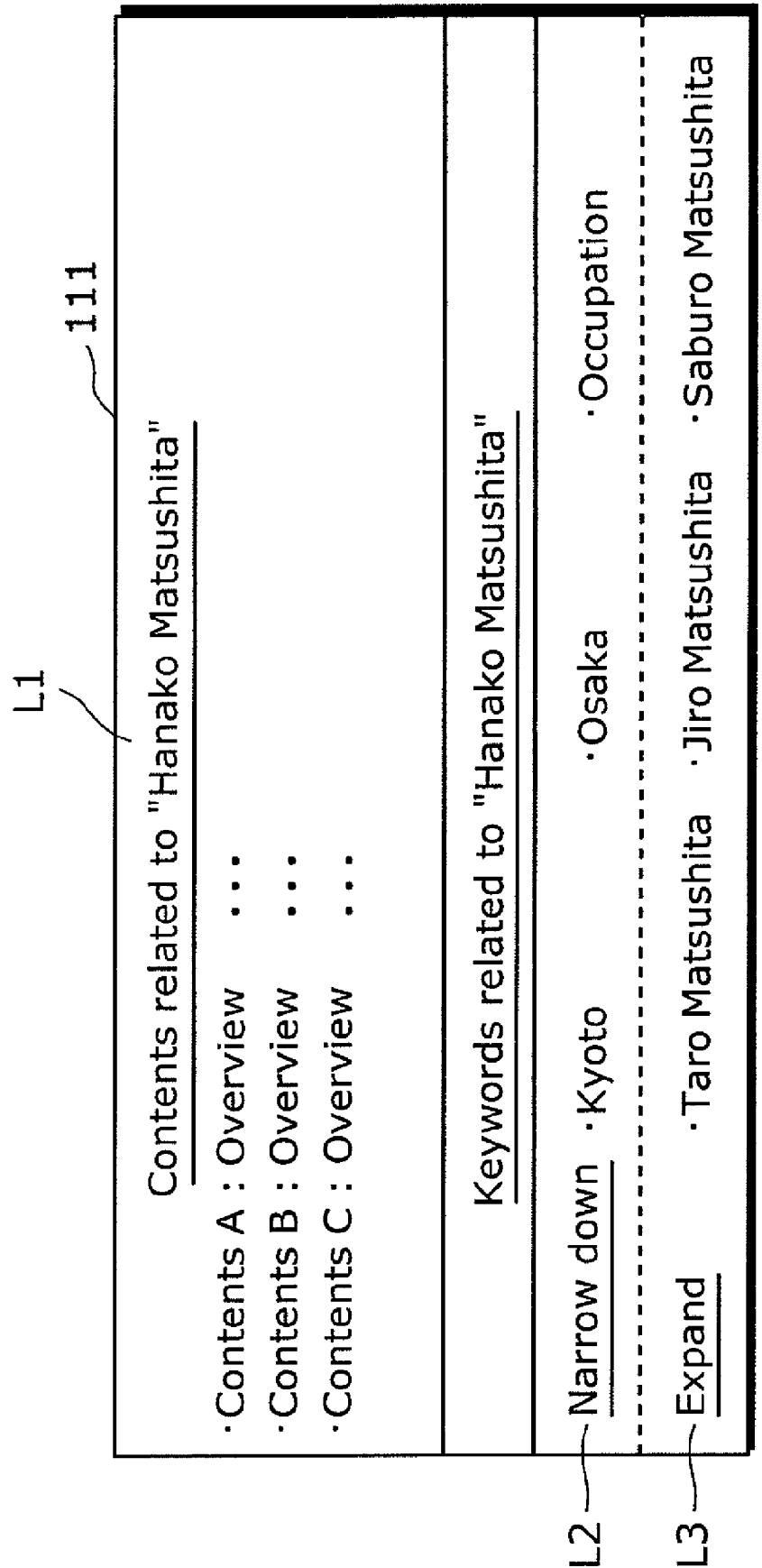
FIG. 3 is a diagram showing an example screen displayed by the contents retrieval device after the initial search screen.

FIG. 3 is an example of the screen displayed by the contents retrieval device 100 after the initial search screen.

As described above, when any of the initial search keywords on the initial search screen is selected as the input option, the contents retrieval device 100 retrieves the contents and the related keywords related to the initial search keyword, and displays the search result screen of the initial search keyword on the output unit 111. On the search result screen, the contents list L1 which indicates a list of the contents attribute information related to the selected initial search keyword (name of the contents and the overview), and the narrowing-down list L2 which indicates a list of the narrowing-down keywords related to the selected initial search keywords, and an expansion list L3 which indicates a list of the expansion keywords related to the selected initial search keywords are displayed. Note that, the contents attribute information, the narrowing-down keywords, and the expansion keywords are respectively displayed as new options.

For example, when the initial search keyword "Hanako Matsushita" is selected on the initial search screen as described above, the names of the plurality of contents and the overview of the contents related to "Hanako Matsushita" are displayed on the contents list L1, the plurality of narrowing-down keywords related to "Hanako Matsushita" is displayed on the contents list L2, and the plurality of expansion keywords related to "Hanako Matsushita" is displayed on the expansion list L3.

Here, the user selects the name of the contents and others when there is a name of the contents that the user is going to view on the contents list L1 of the search result screen of the output unit 111. As a result, the contents retrieval device 100 extracts the contents data corresponding to the name of the selected contents (the input option indicating the contents) from the contents database 109, reproduces the contents, and displays the contents on the output unit 111. This ends the contents retrieval.

On the other hand, when there is no name of the contents that the user is going to view on the contents list L1 on the search result screen, the user selects related keyword that is likely to be related to the contents that he/she is going to view from the narrowing-down list L2 or the expansion list L3. As a result, the contents retrieval device 100 sets the selected related keyword as the next search keyword (input option), and retrieves the contents and related keywords related to the search keyword, and display the search result screen to the search keyword on the output unit 111.

Figure 4:
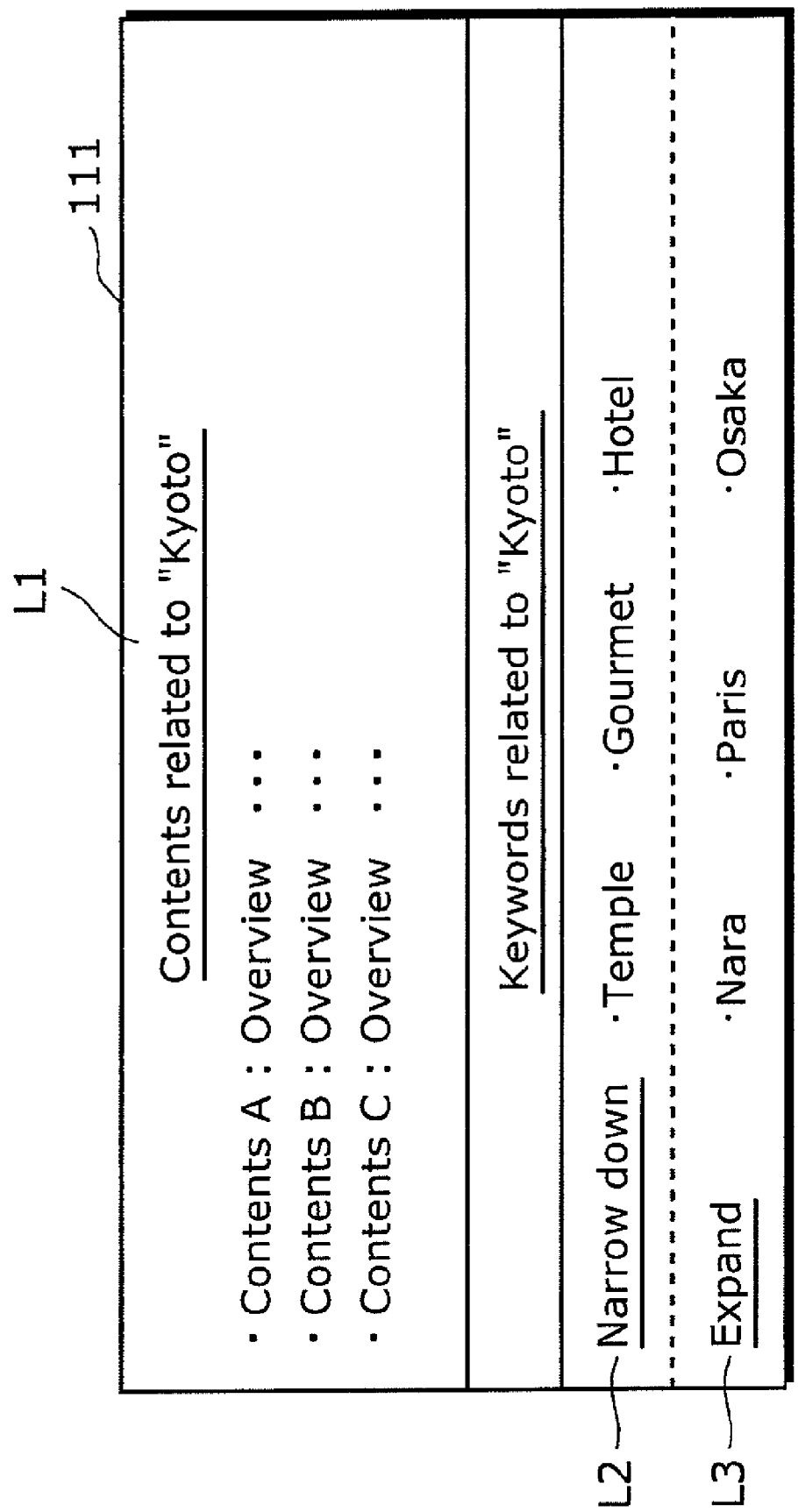
FIG. 4 is a diagram showing an example of another search result screen displayed by the contents retrieval device after the search result screen.

FIG. 4 is a diagram showing an example of another search result screen displayed by the contents retrieval device after the search result screen.

For example, when the narrowing-down keyword "Kyoto" is selected from the narrowing-down list L2 on the search result screen in FIG. 3, the names of the plurality of contents and the overview of the contents related to "Kyoto" are displayed on the contents list L1, the plurality of narrowing-down keywords related to "Kyoto" is displayed on the narrowing-down list L2, and the plurality of expansion keywords related to "Kyoto" is displayed on the expansion list L3.

As described above, the contents retrieval device 100 repeats, every time the user selects the related keyword (the narrowing-down keyword or the expansion keyword), retrieving new contents related to the search keyword and related keyword related to the search keyword, using the related keyword as a new search keyword, and displaying the contents and the related keyword.

Here, each component of the contents retrieval device 100 is explained in detail.

FIG. 5 is an example of a plurality of contents attribute information accumulated in the contents database 109.

The contents attribute information CA includes, for example, the contents ID for identifying the contents, the name of contents, the time when the viewing of the contents starts, the keyword of the contents, and the overview of the contents.

Note that the keyword included in the contents attribute information CA is extracted from the description and the title described as the attributes of the contents data such as EPG, using morphological analysis, for example. Furthermore, the keyword ID for identifying the keyword is attached to each keyword included in the contents attribute information CA.

Figure 6:
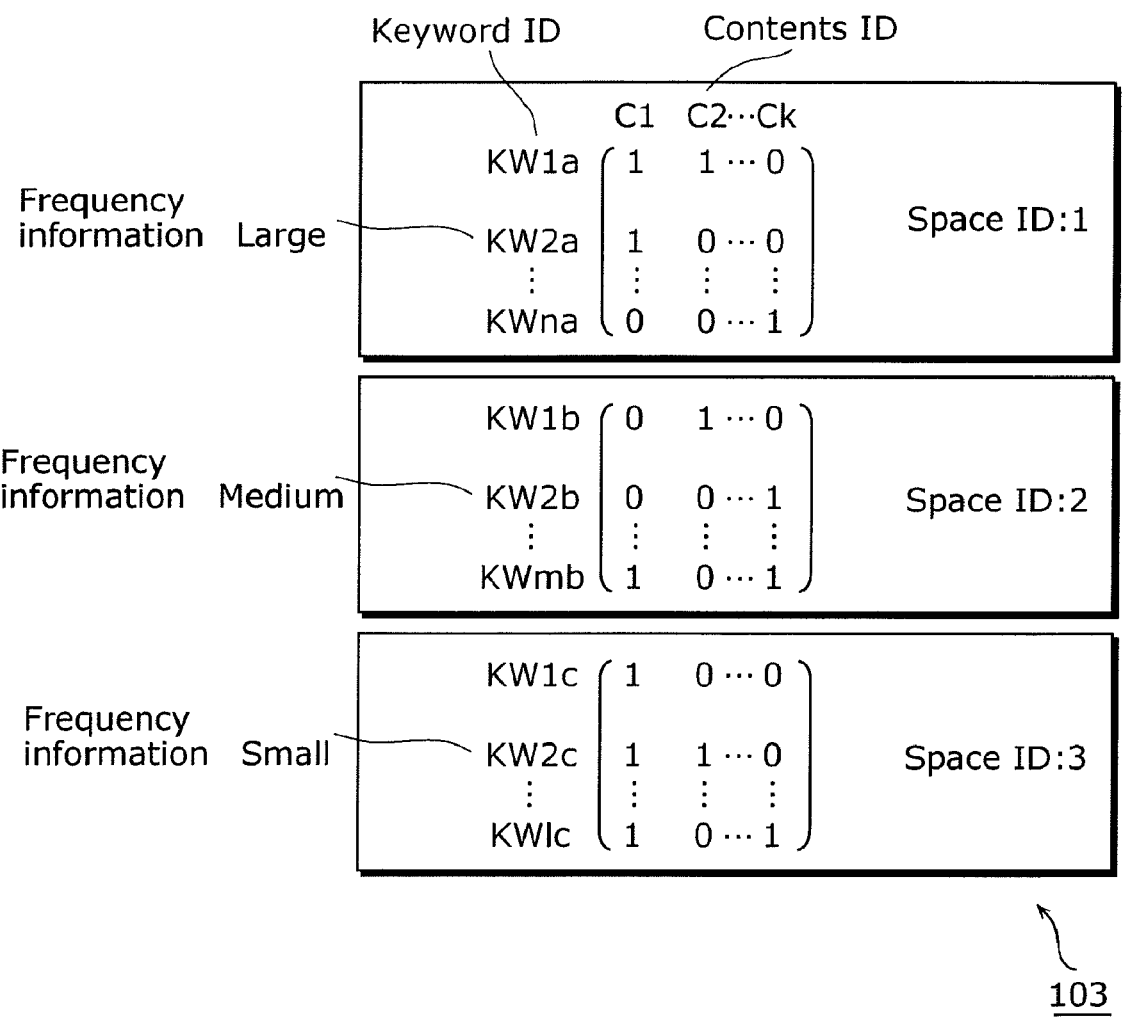
FIG. 6 is a diagram showing a plurality of document spaces stored in the document space database according to the embodiment of the present invention.

FIG. 6 is a diagram showing a plurality of document spaces stored in the document space database 103.

The three document spaces indicated by the space IDs "1, 2, 3" are stored in the document space database 103, for example.

Each document space indicates a degree of relevance among each of the plurality of keywords (keyword ID) included in the contents attribute information CA described above, and among all of the contents (contents ID) indicated by the contents database 109, using the matrix. For example, the TF-IDF value is used as the degree of relevance.

The TF-IDF value is a weight for keywords in combination of the comprehensiveness of the keywords with respect to the document (contents) and the specificity. "Information Retrieval and Language Processing", (pp. 32-33, University of Tokyo Press 1999) (Non-patent reference 1) discloses a specific calculation method, for example.

Note that the value such as the TF-IDF value may be abstracted by Latent Semantic Indexing (hereinafter referred to as LSI). When the LSI is used, the keywords that have been processed in a higher dimension may be reciprocally related in a lower dimension. Accordingly, it is possible to conduct a search based on the meaning and the concept of the keyword. For example, the keywords "yakyuu ("baseball" in Japanese)" and "baseball" are two separated keywords. Accordingly, it is not possible to retrieve a document including one keyword when conducting a search using the other keyword. However, in the lower dimension space, it is expected that the related keywords are degenerated into one dimension, and thus it is possible to retrieve a program including "baseball" with the keyword input of "yakyuu". "Information Retrieval Algorithm" (pp. 65-77, KYORITSU SHUPPAN CO., LTD, 2002) (Non-patent reference 2) describes a document retrieval method using the LSI.

Note that, in the example shown in FIG. 6, the degree of relevance "1" is indicated for the keyword that appears in the contents (the contents attribute information CA), and the degree of relevance "0" is indicated for the keyword that does not appear in the contents. For example, the document space of the space ID "1" indicates the degrees of relevance to the contents IDs "C1, C2 . . . Ck" of the keyword ID "KW1a" as "1, 1 . . . 0".

Furthermore, the three document spaces are divided according to the frequency information of the keyword. The frequency information of the keyword is an occurrence frequency where the keyword occurs in each of the contents of the contents database 109. For example, the DF (Document Frequency: the number of documents where the keyword appears) value which is an index associated with the number of contents to the keyword is used as the frequency information, for example. Accordingly, the frequency information of the keyword that occurs in more contents (the contents attribute information CA) indicates a larger value, while the frequency information of the keyword that occurs in fewer contents (the contents attribute information CA) indicates a smaller value.

For example, the document space of the space ID "1" indicates a degree of relevance between each keyword having a large frequency information value and each of the contents, the document space of the space ID "2" indicates a degree of relevance between each keyword having a medium frequency information value and each of the contents, and the document space of the space ID "3" indicates a degree of relevance between each keyword having a small frequency information value and each of the contents.

More specifically, each keyword of the keyword IDs "KW1$a$, Kw2$a$ . . . KWna" occurs in many contents (the contents attribute information CA), and thus it is categorized in the documents space of the space ID "1". Each keyword of the keyword IDs "KW1$b$, Kw2$b$ . . . KWnb" occurs in the moderate number of contents (the contents attribute information CA), and thus it is categorized in the documents space of the space ID "2". Each keyword of the keyword IDs "KW1$c$, Kw2$c$ . . . KWnC" occurs in the small number of contents (the contents attribute information CA), and thus it is categorized in the documents space of the space ID "3".

Note that the document space is updated in response to the update of the contents database. Accordingly, the correspondence between the space ID and the keyword (the keyword ID) changes due to the update of the contents database. For example, the keyword "skiing" occurs more in winter. Thus, in winter, the keyword (the keyword ID) is associated with the space ID of a higher level, more specifically, the space ID in the document space having a larger value indicated by the frequency information. In contrast, in summer, the occurrence frequency of the keyword "skiing" decreases. Thus, the keyword (the keyword ID) is associated with the space ID of a lower level, more specifically, the space ID in the document space having a smaller value indicated by the frequency information.

With this, the association between the keywords and the number of the programs that the user think of can be appropriately performed, according to the change in time, and thus it is possible to present the narrowing-down keyword and the expansion keyword, without awkward feeling.

The feature of this embodiment is that the document space indicating the relationship between the contents included in the contents database 109 and each keyword is divided into multiple pieces according to the occurrence frequency of the keyword.

When the input option displayed on the contents list L1 of the search result screen shown in FIG. 3 is received, the input determining unit 101 determines that the input selection indicates the contents, and outputs the contents ID which is the input option to the output generating unit 110.

On the other hand, when the input option displayed on the narrowing-down list L2 or the expansion list L3 of the search result screen shown in FIG. 3 is received, the input determining unit 101 determines that the input selection indicates the keyword, and stores the keyword ID which is the input option and the keyword indicated by the keyword ID in the keyword storage unit 102. Here, the input determining unit 101 stores, in the keyword storage unit 102, search mode flag which indicates the input option is selected either from the narrowing-down list L2 of the expansion list L3 shown in FIG. 3, and the search step indicating which selection it was in number from the time when the search is started, together with the keyword ID and the keyword.

FIG. 7 is a diagram showing information stored in the keyword storage unit 102.

When the input determining unit 101 receives the input option indicating the initial search keyword "Hanako Matsushita" selected from among the plurality of options on the initial search screen, the input determining unit 101 associates the keyword "Hanako Matsushita", the keyword ID "10", and the search step "1" which indicates the first selection, and store them in the keyword storage unit 102. Note that the input option here is not included in the narrowing-down list L2 or the expansion list L3, and thus the input determining unit 101 associates the search mode flag "early stage" with the keyword and store the search mode flag, and stores them in the keyword storage unit 102.

Next, when the input determining unit 101 receives the input option indicating the keyword "Kyoto" selected from among the plurality of options in the search result screen indicated in FIG. 3, the input determining unit 101 associates the keyword "Kyoto", the keyword ID "23", the search step "2" which indicates the second selection, and the search mode flag "narrowing-down" indicating that the option is selected from the narrowing-down list L2, and store them in the keyword storage unit 102.

Note that the input determining unit 101 may associate the space ID of the document space where the keyword indicated by the input option belongs to, and store the space ID in the keyword storage unit 102.

As described above, the information including the search step, the keyword, the keyword ID and the search mode flag that are associated with one another and stored in the keyword storage unit 102 will be hereafter referred to as the keyword information.

The contents estimation unit 107 estimates the contents related to the search keyword using the keyword information stored in the keyword storage unit 102 as shown in FIG. 7 and the plurality of document spaces stored in the document space database 103 as shown in FIG. 6.

Here, the contents estimation unit 107 estimates the contents with the narrowing-down mode and with the expansion mode, according to the search mode flag of the search keyword.

Figure 8:
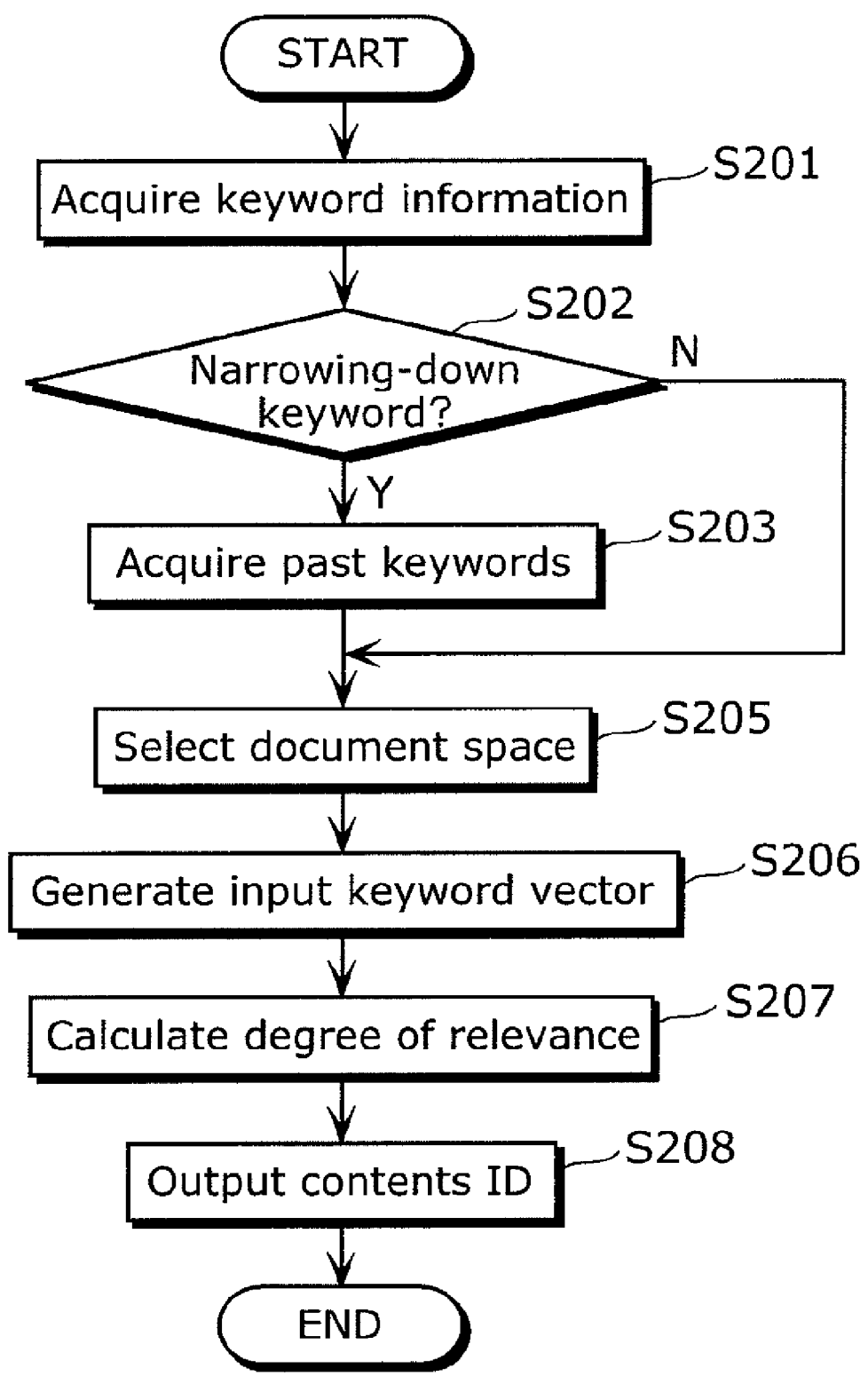
FIG. 8 is a flowchart showing the operation of the contents estimation unit according to the embodiment of the present invention.

FIG. 8 is a flowchart showing the operation of the contents estimation unit 107.

First, when the keyword information of the search keyword is stored in the keyword storage unit 102, the contents estimation unit 107 acquires the keyword information from the keyword storage unit 102 (step S201).

For example, when the keyword "gourmet" that was selected in the third selection is stored in the keyword storage unit 102 as the search keyword, the contents estimation unit 107 acquires the keyword information indicating the keyword "gourmet", the keyword ID "54", and the keyword mode flag "expansion" from the keyword storage unit 102.

Next, the contents estimation unit 107 determines, based on the search mode flag included in the keyword information acquired in step S201, whether or not the search keyword included in the keyword information is a narrowing-down keyword (step S202). More specifically, the contents estimation unit 107 determines that the search keyword is a narrowing-down keyword when the search mode flag indicates "narrowing-down", and determines that the search keyword is an expansion keyword when the search mode flag indicates "expansion".

Here, when the contents estimation unit 107 determines that the search keyword is a narrowing-down keyword (Y in step S202), the contents estimation unit 107 extracts past keywords stored in the keyword storage unit 102 before the recent keyword whose search mode flag indicates "expansion" or "early stage" is stored (step S203). More specifically, the contents estimation unit 107 acquires, in step S201 and step S203, a recent narrowing-down keyword or the plurality of consecutive narrowing-down keywords, and an initial search keyword or an recent expansion keyword.

The contents estimation unit 107 selects, when it is determined that the search keyword is an expansion keyword (N in step S202), or after step S203, the document space which indicates the search keyword and the degree of relevance between the past keywords, from the document space database 103 (step S205).

For example, when the contents estimation unit 107 acquires the keyword of the keyword ID "KW2*c*" as the search keyword in step S201, the contents estimation unit 107 selects the document space of the space ID "3" corresponding to the keyword of the keyword ID "KW2*c*". Furthermore, when the contents estimation unit 107 acquires past keyword of the keyword ID "KW2*b*" in step S203, contents estimation unit 107 selects the document space of the space ID "2" corresponding to the keyword of the keyword ID "KW2*b*".

Next, when the search keyword is a narrowing-down keyword, the contents estimation unit 107 generates an input keyword vector according to the narrowing-down keyword, and when the search keyword is an expansion keyword, the contents estimation unit 107 generates an input keyword vector according to the expansion keyword (step S206).

More specifically, when the search keyword is a narrowing-down keyword, the contents estimation unit 107 generates the input keyword vector according to whether or not each keyword categorized in each document space in step S203 is acquired in step S201 and step S203.

For example, when the keyword ID of the search keyword (narrowing-down keyword) acquired in step S201 is "KW2*c*", and when the keyword ID of the past keyword acquired in step S203 is "KW2*b*", the document space of the space ID "3" corresponding to the search keyword, and the document space of the space ID "2" corresponding to the past keyword are selected in step S205.

Here, the keywords of the keyword IDs "KW2*c* and KW2*b*" are acquired from among the keywords categorized in the document spaces of the space IDs "2 and 3" (the keyword IDs=KW1*b*, KW2*b* . . . KWmb, KW1*c*, KW2*c* . . . and KW1*c*). Accordingly, the contents estimation unit 107 generates the input keyword vectors (KW1*b*, KW2*b* . . . KWmb, KW1*c*, KW2*c* . . . KWlc)=(0, 1 . . . 0, 0, 1 . . . 0) such that "1" is indicated to the keywords that have been acquired, and "0" is indicated to the keywords that have not been acquired.

Meanwhile, when the search keyword is an expansion keyword, the contents estimation unit 107 generates the input keyword vector according to whether or not each keyword categorized in each document space selected in step S205 is acquired in step S201.

For example, the keyword ID of the search keyword (expansion keyword) acquired in step S201 is "KW2*b*", the document space of the space ID "2" corresponding to the search keyword is selected in step S205.

In this case, the keyword of the keyword ID "KW2*b*" is acquired from among the keywords categorized in the document space of the space ID "2" (the keyword IDs=KW1*b*, KW2*b* . . . KWmb). Accordingly, the contents estimation unit 107 generates the input keyword vectors (KW1*b*, KW2*b* . . . KWmb,)=(0, 1 . . . 0) such that "1" is indicated to the keywords that have been acquired, and "0" is indicated to the keywords that have not been acquired.

Next, the contents estimation unit 107 calculates the degree of relevance of each of the contents with respect to the search keyword by calculating the cosine distance between the input keyword vector generated in step S206 and the column vector of each of the contents indicated by the document space selected in step S205 (step S207).

Subsequently, the contents estimation unit 107 estimates the contents calculated to have a degree of relevance higher than the threshold as the contents that the user is trying to view, and outputs the contents ID of the contents (step S208).

Note that, in step S206, the input keyword vector may be generated with other methods. For example, the contents estimation unit 107 retrieves the contents related to the search keyword and the contents related to the past keywords which are the keywords stored in the keyword storage unit 102 except the search keyword. Next, when the ratio of the number of overlapping contents is equal to or higher than the threshold, the contents estimation unit 107 generates the input keyword vector using all of the keywords including the search keyword and the past keywords. On the other hand, when the ratio or the number of overlapping contents is less than the threshold, the contents estimation unit 107 may generate the input keyword vector with the search keyword only, without using the past keywords. With this, it is possible to generate the input keyword vector suitable for the contents that the user searches for, from among the past keywords stored in the keyword storage unit 102, allowing appropriate estimation of the contents that the user wishes to search for.

The document space selection unit 104 reads the keyword information including the search keyword stored in the keyword storage unit 102, and finds the document space corresponding to the search keyword, more specifically, the document space indicating the degree of relevance of the search keyword from the document space database 103.

Here, when the search mode flag of the search keyword indicates "narrowing-down", in other words, when the search keyword is displayed as the narrowing-down keyword, the document space selection unit 104 selects the document space indicated by the space ID larger than the space ID of the document space corresponding to the search keyword, as the narrowing-down document space.

For example, when the keyword ID of the search keyword displayed as the narrowing-down keyword is "KW2*b*" the document space selection unit 104 find the document space of the space ID "2" corresponding to the search keyword of the keyword ID "KW2*b*" from the document space database 103 shown in FIG. 6. Furthermore, the document space selection unit 104 selects the document space having the space ID "3" which is larger than the space ID "2" as the narrowing-down document space.

More specifically, the document space selection unit 104 selects the document space corresponding to the occurrence frequency less than the occurrence frequency of the document space indicating the degree of relevance of the search keywords as the narrowing-down document space information.

On the other hand, when the search mode flag of the search keyword indicates "expansion", in other words, when the search keyword is displayed as the expansion keyword, the document space selection unit 104 selects the document space indicated by the space ID equal to or smaller than the space ID of the document space corresponding to the search keyword as the expansion document space.

For example, when the keyword ID of the search keyword displayed as the expansion keyword is "KW2*b*", the document space selection unit 104 finds the document space of the space ID "2" corresponding to the search keyword of the keyword ID "KW2*b*" from the document space database 103 shown in FIG. 6. Subsequently, the document space selection unit 104 selects the documents spaces of the space IDs "1, 2" which are equal to or smaller than the space ID "2" as the expansion document space.

More specifically, the document space selection unit 104 selects the document space information corresponding to the occurrence frequency equal to or higher than the occurrence frequency of the document space information indicating the degree of relevance of the search keyword as the expansion document space information.

As described above, the document space selection unit 104 according to this embodiment includes the first document space selection unit which selects the document space corresponding to the occurrence frequency less than the occurrence frequency of the document space indicating the degree of relevance of the search keyword from the document space database 103 as the narrowing-down document space, and the second document space selection unit which selects the document space corresponding to the occurrence frequency equal to or higher than the occurrence frequency of the document space indicating the degree of relevance of the search keyword as the expansion document space.

The search condition determining unit 105 reads the keyword information including the search keywords stored in the keyword storage unit 102, and specifies the search mode flag of the search keyword. As a result, when the search mode flag indicates "narrowing-down", the search condition determining unit 105 determines that the search mode to the search keyword is in the narrowing-down mode. On the other hand, when the search mode flag indicates "expansion", the search condition determining unit 105 determines that the search mode to the search keyword is in the expansion mode.

More specifically, when the input determining unit 101 acquires the narrowing-down keyword as the search keyword by the user's selection of the narrowing-down keyword displayed by the output unit 111, the search condition determining unit 105 determines that the narrowing-down search is performed by the contents estimation unit 107. Meanwhile, when the input determining unit 101 acquires the expansion keyword as the search keyword by the user's selection of the expansion keyword displayed by the output unit 111, the search condition determining unit 105 determines that the expansion search is performed by the contents estimation unit 107.

When the search mode determined by the search condition determining unit 105 is in the narrowing-down mode, the related keyword generation ratio determining unit 106 determines the display ratio where the number of the narrowing-down keywords to be displayed is larger than the number of expansion keywords. When the search mode determined by the search condition determining unit 105 is in the expansion mode, the related keyword generation ratio determining unit 106 determines the display ratio where the number of the expansion keywords to be displayed is larger than the number of narrowing-down keywords.

For example, the related keyword generation ratio determining unit 106 holds a threshold of 70%, and when the search mode is in the narrowing-down mode, the number of narrowing-down keywords: the number of expansion keywords=7:3 as the display ratio is determined as the display ratio, and when the search mode is in the expansion mode, the number of narrowing-down keywords: the number of expansion keywords=3:7 is determined as the display ratio.

As a result, on the search result screen, the narrowing-down keywords and the expansion keywords in accordance with the display ration are displayed. For example, when the maximum number of the related keywords is 10 in the search result screen, 7 narrowing-down keywords are displayed on the narrowing-down list L2 and 3 expansion keywords are displayed on the expansion list L3 when the number of narrowing-down keywords: the number of expansion keywords=7:3. Meanwhile, 3 narrowing-down keywords are displayed on the narrowing-down list L2 and 7 expansion keywords are displayed on the expansion list L3 when the number of narrowing-down keywords: the number of expansion keywords=3:7.

The related keyword estimation unit 108 acquires the space IDs of the narrowing-down document space and the expansion document space selected by the document space selection unit 104, and acquires the contents ID of the contents estimated by the contents estimation unit 107. As a result, the related keyword estimation unit 108 specifies the keyword associated with the contents of the acquired contents ID with a degree of relevance equal to or higher than the threshold in the narrowing-down document space of the document space database 103 indicated by the acquired space ID as a candidate for the narrowing-down keyword. Furthermore, the related keyword estimation unit 108 specifies the keyword associated with the contents of the acquired contents ID with a degree of relevance equal to or higher than the threshold in the expansion document space of the document space database 103 indicated by the acquired space ID, as a candidate for the expansion keyword. Note that, the related keyword estimation unit 108 specifies the keywords except the keyword identical to the search keyword as the narrowing-down keyword or the expansion keyword.

Furthermore, the related keyword estimation unit 108 acquires the display ratio from the related keyword generation ratio determining unit 106, and determines the number of the narrowing-down keywords and the expansion keywords to be displayed (the number of narrowing-down display and the number of expansion display) based on the display ratio. As a result, the related keyword estimation unit 108 sequentially selects the candidate, as many as the number of narrowing-down display, as the narrowing-down keywords to be displayed, in the order of higher degree of relevance from among the specified candidates of the narrowing-down keywords. Furthermore, the related keyword estimation unit 108 sequentially selects the candidate, as many as the number of expansion display, as the expansion keywords to be displayed, in the order of higher degree of relevance from among the specified candidates of the expansion keywords.

FIG. 9 is an explanatory diagram for explaining the operation of the related keyword estimation unit 108 for specifying candidates for related keywords.

The related keyword estimation unit 108 acquires, for example, the space ID "2" of the narrowing-down document space from the document space selection unit 104 and acquires the contents ID "C4" from the contents estimation unit 107. In this case, the related keyword estimation unit 108 specifies the keywords associated with the acquired contents ID "C4" with the degree of relevance equal to of higher than the threshold "0.5" in the narrowing-down document space in the document space database 103 which is indicated by the acquired space ID "2", as the candidates of the narrowing-down keyword.

More specifically, the related keyword estimation unit 108 refers to the column vector (0.8, 0.2, 0.1, 0.4, and 0.7) corresponding to the contents ID "C4" from among the matrix which is the narrowing-down document space of the space ID "2". Subsequently, the related keyword estimation unit 108 specifies the keywords of the keyword IDs "KW1$b$, KW5$b$", corresponding to the degrees of relevance "0.8, 0.7" which are higher than the threshold "0.5" in the column vector.

Figure 10:
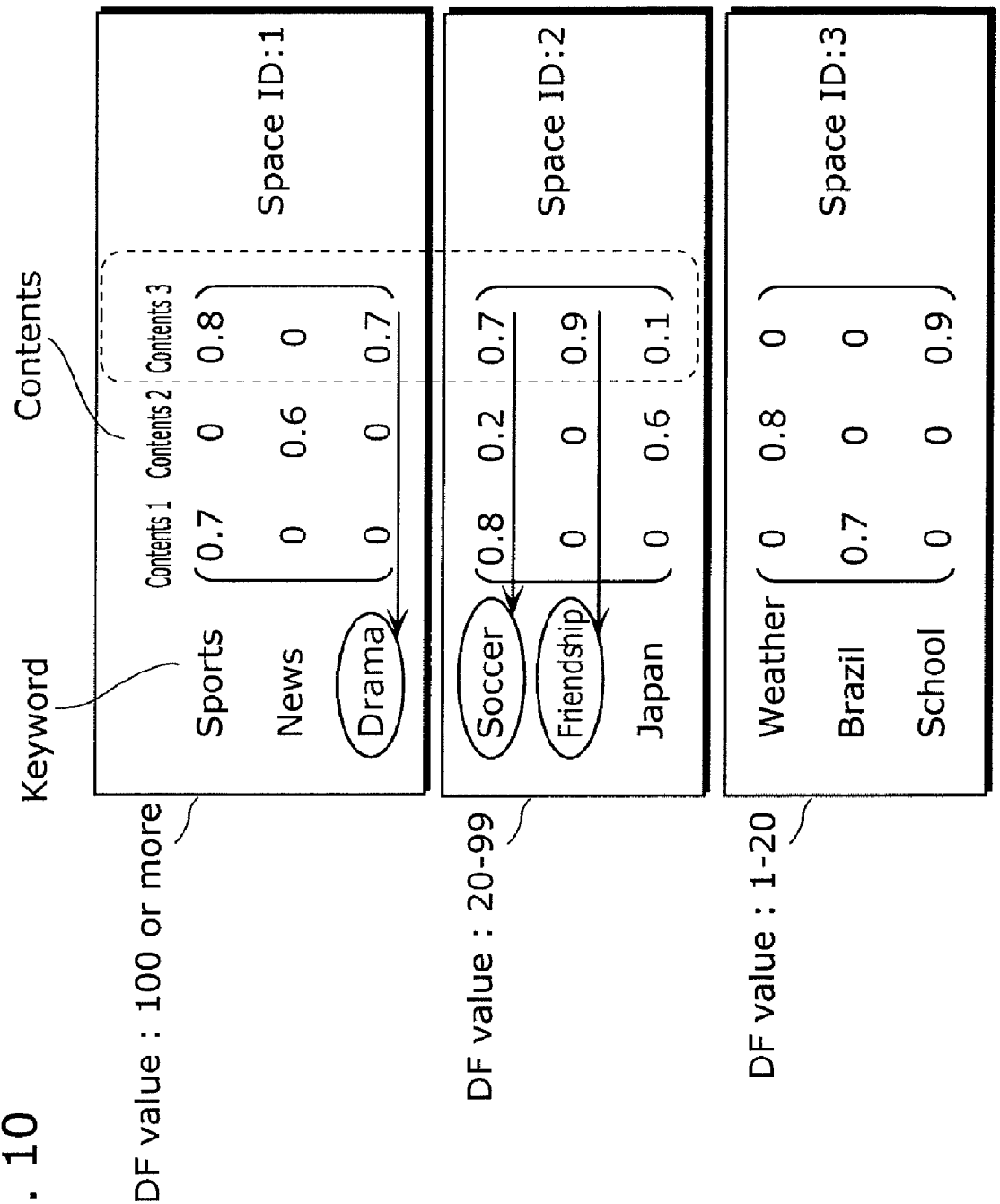
FIG. 10 is an explanatory diagram for specifically explaining the operation of the related keyword estimation unit for estimating the related keyword.

FIG. 10 is an explanatory diagram for specifically explaining the operation of the related keyword estimation unit 108 for estimating the related keyword.

The three document spaces indicating the relationships between, for example, the contents 1, the contents 2 and the contents 3 and each keyword (the space ID=1, 2, and 3) are stored in the document space database 103.

The document space of the space ID "1" indicates the relationship between the keywords having DF values, which are the frequency information, equal to or higher than 100, namely, "sports, news, drama" and the contents 1, 2, and 3. The document space of the space ID "2" indicates the relationship between the keywords having DF values larger than 20 and equal to smaller than 99, namely, "soccer, friendship, Japan" and the contents 1, 2, and 3. The document space of the space ID "3" indicates the relationship between the keywords having DF values equal to or larger than 1 and smaller than 20, namely, "weather, Brazil, school" and the contents 1, 2, and 3. Furthermore, the relationship between the keywords and the contents are indicated by the TF-IDF value, which is a degree of relevance between them.

In such a case, when the related keyword estimation unit 108 acquires the contents ID indicating the contents 3 which is a program related to the sports drama from the contents estimation unit 107, and when the space ID "2" indicating the narrowing-down document space is acquired from the document space selection unit 104, the related keyword estimation unit 108 refers to the column vector (0.7, 0.9, and 0.1) corresponding to the contents 3 and the narrowing-down document space (the document ID=2) in the document space database 103. Subsequently, the related keyword estimation unit 108 specifies, the keywords "soccer, friendship" having the TF-IDF values "0.7, 0.9", which are higher than the threshold "0.5" in the column vector as the candidates of the narrowing-down keyword.

Further, the related keyword estimation unit 108 acquires the display ratio from the related keyword generation ratio determining unit 106, and determines the number of narrowing-down display using the maximum number of the related keywords that can be displayed on the search result screen and the display ratio. The related keyword estimation unit 108, for example, selects only the narrowing-down keyword "friendship" having the highest TF-IDF value out of the candidates of the narrowing-down keywords "soccer, friendship" specified as described above, as the narrowing-down keyword that should be displayed on the search result screen.

The related keyword estimation unit 108 estimates the narrowing-down keyword with the selection, and outputs the keyword ID of the narrowing-down keyword to the output generating unit 110.

On the other hand, when the related keyword estimation unit 108 acquires the contents ID indicating the contents 3 from the contents estimation unit 107 and acquires the space ID "1" indicating the expansion document space from the document space selection unit 104, the related keyword estimation unit 108 refers to the column vector (0.8, 0, 0.7) corresponding to the contents 3 and the expansion document space (space ID=1) in the document space database 103. Subsequently, the related keyword estimation unit 108 specifies the keyword "drama" having the TF-IDF value "0.7" which is higher than the threshold "0.5" in the column vector, as the candidate for the expansion keyword.

Note that, since the search keyword is "sports", the related keyword estimation unit 108 specifies the candidate for the expansion keyword having the TF-IDF value higher than the threshold out of the other keywords except the keyword "sports", when there is the keyword "sports" in the expansion document space. Accordingly, in the example above, the TF-IDF values equal to or higher than the threshold "0.5" in the column vector include "0.8" and "0.7". However, the keyword "drama" having the TF-IDF value "0.7" is specified as the candidate of the expansion keyword.

Further, the related keyword estimation unit 108 acquires the display ratio from the related keyword generation ratio determining unit 106 as described above, and determines the number of expansion display using the maximum number of the related keywords that can be displayed on the search result screen and the display ratio. For example, when there are a plurality of candidates of the expansion keywords that have been specified as described above, the related keyword estimation unit 108 sequentially selects the candidates, as many as the number of expansion display, as the expansion keywords to be displayed, in the order of larger TF-IDF values, from among the specified candidates of the expansion keywords.

The related keyword estimation unit 108 estimates the expansion keyword with the selection, and outputs the keyword ID of the expansion keyword to the output generating unit 110.

Figure 11:
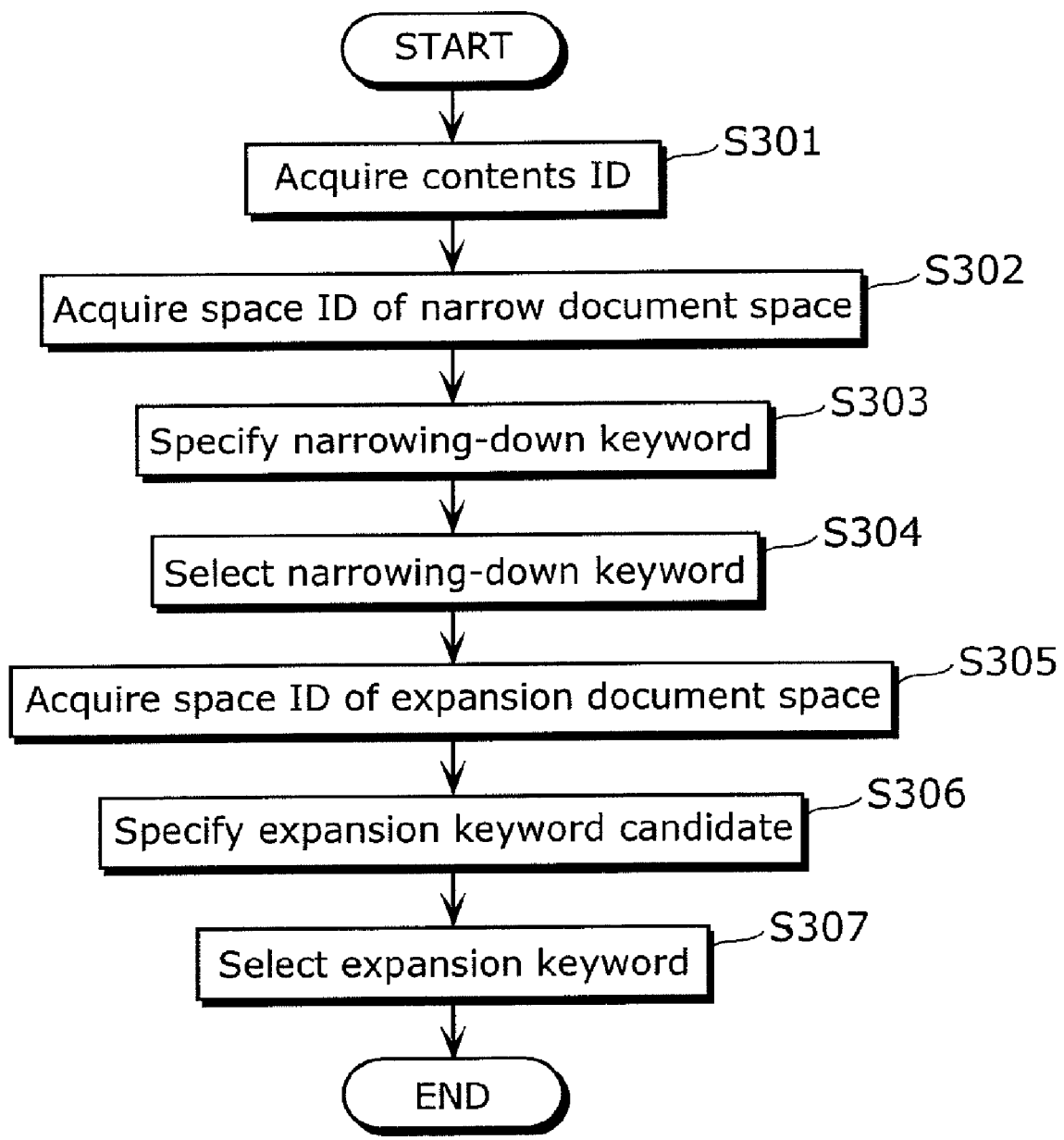
FIG. 11 is a flowchart indicating the operation of the related keyword estimation unit according to the embodiment of the present invention.

FIG. 11 is a flowchart showing the operation of the contents estimation unit 108.

First, the related keyword estimation unit 108 acquires the contents ID of the contents estimated by the contents estimation unit 107 (step S301), and acquires the space ID of the narrowing-down document space selected by the document space selection unit 104 (step S302).

Next, the related keyword estimation unit 108 refers to the column vector in the narrowing-down document space indicated by the space ID acquired in step S302 corresponding to the contents ID acquired in step S302, and specifies the keyword having a degree of relevance higher than the threshold as the candidate for the narrowing-down keyword (step S303). Furthermore, the related keyword estimation unit 108 determines the number of narrowing-down display based on the display ratio output from the related keyword generation ratio determining unit 106, and selects the candidates as many as the number of narrowing-down display as the narrowing-down keywords that should be displayed on the search result screen, in the order of higher degrees of relevance (step S304).

Furthermore, the related keyword estimation unit 108 acquires the space ID of the expansion document space selected by the document space selection unit 104 (step S305).

Subsequently, the related keyword estimation unit 108 refers to the column vector corresponding to the contents ID acquired in step S301 in the expansion document space indicated by the space ID acquired in step S305, and specifies the keyword having a degree of relevance equal to or higher than the threshold as the candidate for the expansion keyword (step S306). Note that, when there is a keyword identical to the search keyword in the expansion document space, the related keyword estimation unit 108 specifies the candidate of the expansion keyword having a degree of relevance equal to or higher than the threshold out of the keywords other than the keyword.

Furthermore, the related keyword estimation unit 108 determines the number of expansion display based on the display ratio output from the related keyword generation ratio determining unit 106, and selects the candidates as many as the number of expansion display as the expansion keywords that should be displayed on the search result screen, in the order of higher degrees of relevance (step S307).

The related keyword estimation unit 108 estimates the narrowing-down keyword and the expansion keyword as the related keyword by executing the process in steps S301 to S307.

Note that, the related keyword estimation unit 108 in this embodiment is configured as the related keyword selection unit which selects the keywords corresponding to the narrowing-down document space and the expansion document space from the contents database 109 as the narrowing-down keyword and the expansion keyword such that the keyword indicating a larger degree of relevance to the contents retrieved by the contents estimation unit 107 is more likely selected.

When the output generating unit 110 acquires the contents ID indicating the contents 3 from the contents estimation unit 107, for example, the contents attribute information corresponding to the contents 3 is extracted from the contents database 109 and output to the output unit 111. Furthermore, when the keyword IDs of the narrowing-down keyword and the expansion keyword is acquired from the related keyword estimation unit 108, the output generating unit 110 extracts the narrowing-down keyword and the expansion keyword from the contents database 109 and outputs to the output unit 111.

Figure 12:
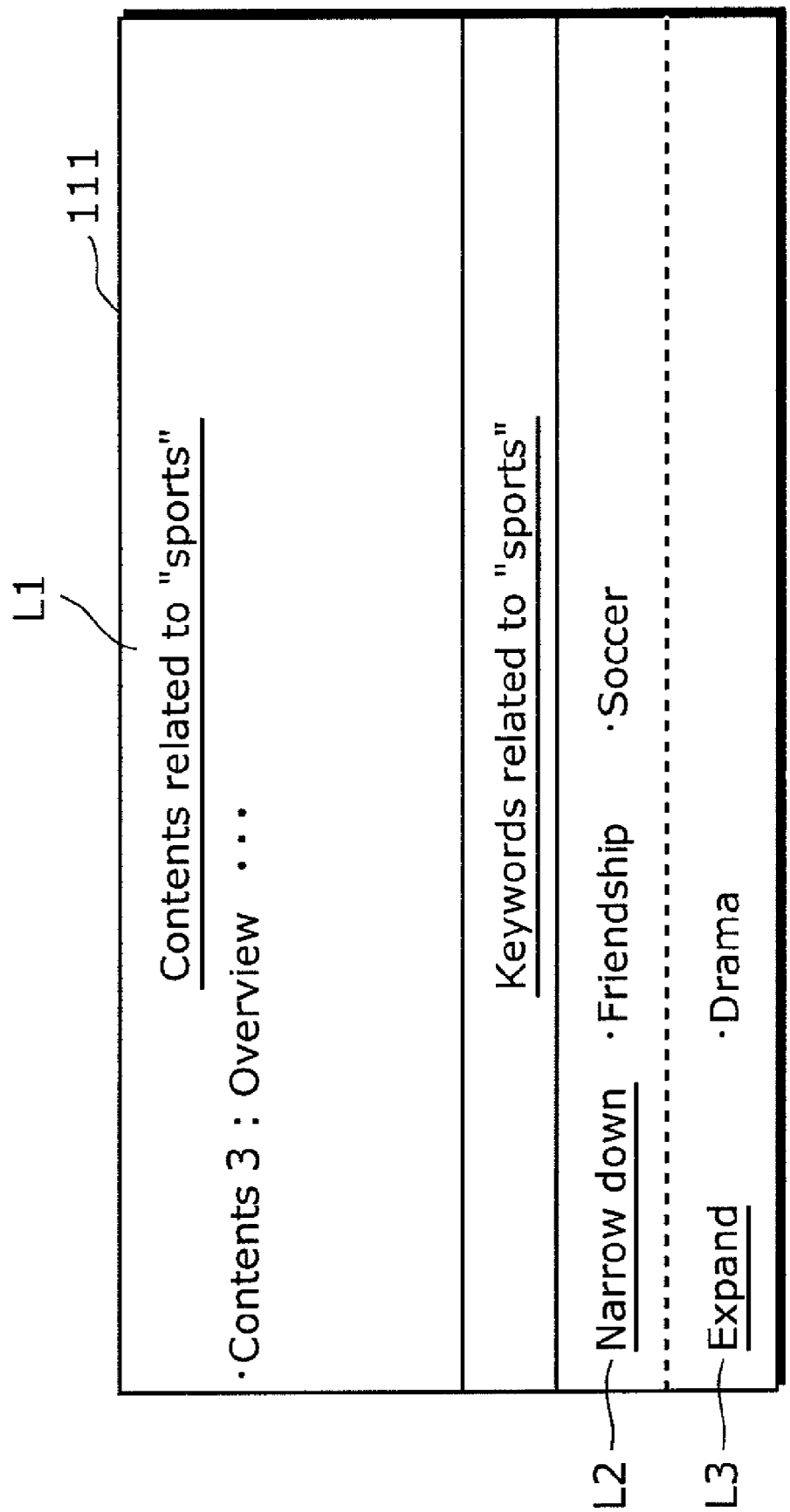
FIG. 12 is a diagram showing an example of the search result screen displayed by the output unit according to the embodiment of the present invention.

FIG. 12 is a diagram showing an example of the search result screen displayed by the output unit 111.

When the output unit 111 acquires the contents attribute information corresponding to the contents 3 and the narrowing-down keyword and the expansion keyword output from the output generating unit 110 as described above, with respect to the search keyword "sports", the output unit 111 arranges them on predetermined locations on the search result screen and displays them.

As a result, on the contents list L1, the name of the contents "the contents 3" and the overview of the contents as the contents attribute information with respect to the contents 3. Furthermore, on the narrowing-down list L2, the narrowing-down keywords "friendship, soccer" for narrowing down the contents listed on the contents list L1 are displayed, and on the expansion list L3, the expansion keyword "drama" which is for performing a search from a perspective different from the search keyword "sports" again is displayed.

Figure 13:
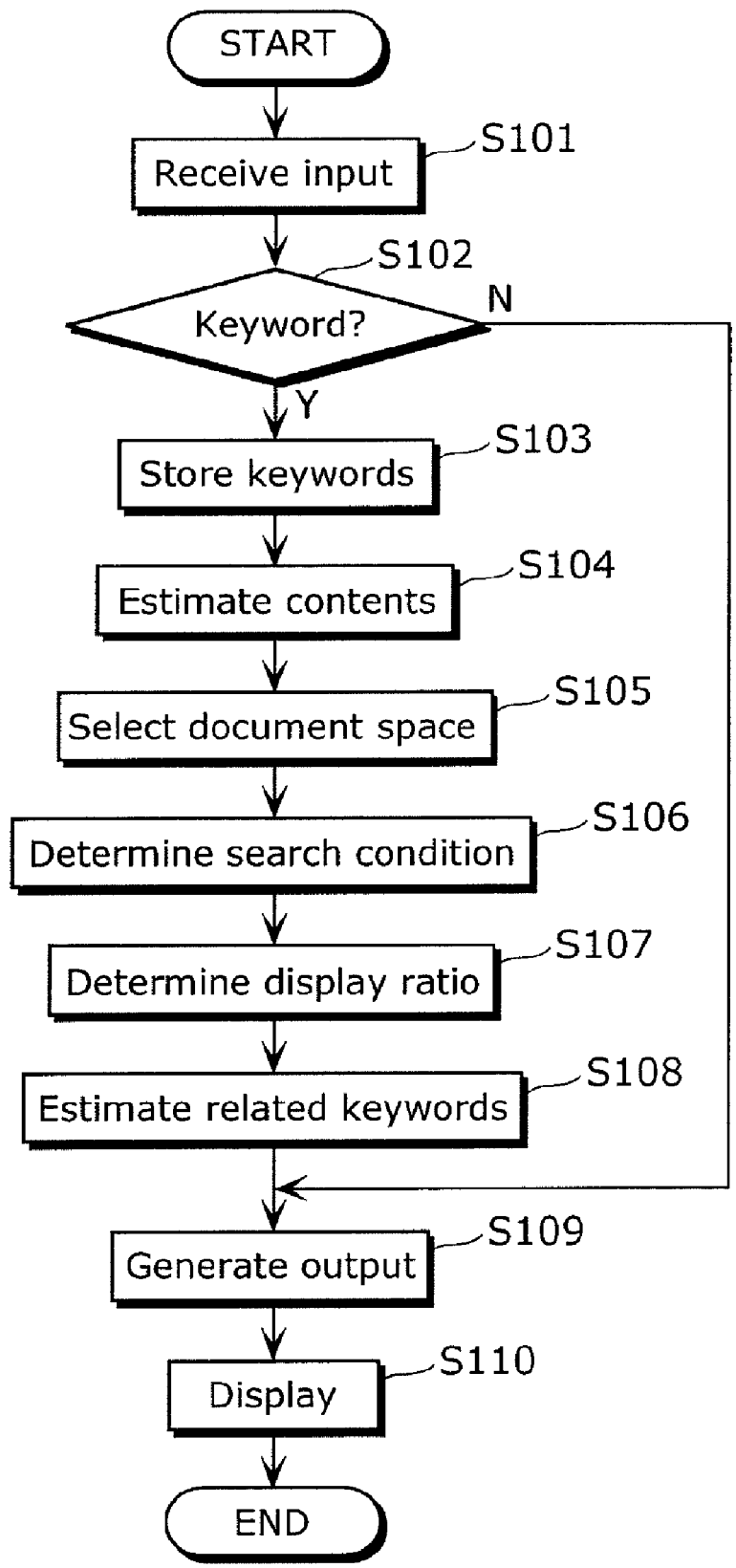
FIG. 13 is a flowchart indicating the entire operation of the contents retrieval device.

FIG. 13 is a flowchart showing the total operation of the contents retrieval device 100.

First, the input determining unit 101 of the contents retrieval device 100 receives the input option selected by the operation of the user (step S101), and determines whether the input option indicates the keyword or the contents (step S102).

Here, when the input determining unit 101 determines that the input option indicates the contents (N in step S102), the output generating unit 110 generates the information for outputting to the output unit 111 by extracting the contents data of the contents from the contents database 109 (step S109). Subsequently, when the output unit 111 acquires the contents data from the output generating unit 110, the output unit 111 reproduces and displays the contents data (step S110).

On the other hand, when the input determining unit 101 determines that the input option indicates the keyword (Y in step S102), the input determining unit 101 stores the keyword information including the keyword (search keyword) and the keyword ID in the keyword storage unit 102 (step S103).

When the keyword information including the search keyword is stored in the keyword storage unit 102 in step S103, the contents estimation unit 107 retrieves the contents related to the search keyword and estimates the contents using the keyword storage unit 102 and the document space database 103 (step S104).

Furthermore, the document space selection unit 104 selects the narrowing-down document space and the expansion document space from among the document space database 103, using the search keyword (step S105).

Furthermore, the search condition determining unit 105 determines whether the search mode is in the narrowing-down mode or the expansion mode, according to the search keyword stored in the keyword storage unit 102 (step S106). Subsequently, the related keyword generation ratio determining unit 106 determines the display ratio of the number of narrowing-down keywords and the expansion keyword that should be displayed, according to the determination result in step S106 (step S107).

When the display ratio is determined in step S107, the related keyword estimation unit 108 estimates the narrowing-down keyword and the expansion keyword, using the narrowing-down document space and the expansion document space using the display ratio, the contents estimated in step S104, and the narrowing-down document space and the expansion document space selected in step S105 (step S108).

As described above, when the narrowing-down keyword and the expansion keyword are estimated, the output generating unit 110 generates the search result information to be output to the output unit 111 by extracting the narrowing-down keyword and the expansion keyword from the contents database 109 (step S109). Subsequently, when the output unit 111 acquires the search result information from the output generating unit 110, the output unit 111 displays the related keyword included in the search result information (step S110).

Furthermore, when any of the related keywords displayed on the output unit 111 is selected by the user, the contents retrieval device 100 receives the selected related keyword as a next, new search keyword. More specifically, the contents retrieval device 100 repeatedly executes the process from step S101. As a result, the user can find the desired contents from the contents database 109.

As described above, in this embodiment, the document spaces having the frequency information smaller than the frequency information of the document space corresponding to the search keyword are selected, using the plurality of document spaces categorized according to the frequency information of the keywords and the keywords indicated by a large degree of relevance with the narrowing-down document space are selected as the narrowing-down keyword. At the same time, the document spaces having the frequency information equal to or larger than the frequency information of the document space corresponding to the search keyword are selected, using the plurality of document spaces categorized according to the frequency information of the keywords and the keywords indicated by a large degree of relevance with the expansion document space are displayed as the expansion keyword.

The following is the reasons for categorizing the document spaces with the frequency information. The values of the frequency information of the keywords and the number of the contents connected to the keywords have positive correlation. Accordingly, it is necessary to present the keyword having frequency information smaller than the value of the frequency information of the search keyword, in order to present the keyword (narrowing-down keyword) for narrowing down the contents to the user. On the other hand, it is necessary to present the keyword having frequency information equal to or larger than the value of the frequency information of the search keyword, in order to present the keyword (expansion keyword) for retrieving the contents other than the contents presented to the user.

Accordingly, categorizing the document spaces such that the keywords having the correlations with the number of contents at the same level are associated with one another, and using the document spaces for selecting the narrowing-down keyword and the expansion keyword separately allows an appropriate narrowing-down keyword and the expansion keyword being simultaneously presented.

More specifically, even when the contents that the user wishes to retrieve changes dynamically, it is possible to present, to the user, the related keywords for retrieving the desired contents, facilitating the user's finding the desired contents from among a large amount of contents.

Note that, in this embodiment, the document spaces is categorized into three categories, and the thresholds (the DF value) for categorization are set at 100 and 20, as shown in FIG. 10. However, the number of the document spaces and the threshold may be determined according to the result of an experiment with a plurality of users in advance, for example. More specifically, the DF values of the keywords included in the entire document spaces are calculated, and the plurality of keywords with different DF values are presented to the user. Subsequently, each keyword is categorized into a group where search results at a similar level are obtained when a search is performed with the presented keyword. This sets the number of document space and the threshold.

The contents retrieval device according to the present invention has been described above with reference to the embodiment; however, the present invention may not be limited to the description.

For example, although the related keyword estimation unit 108 selects the narrowing-down keywords in the order of larger degree of relevance, when selecting a few narrowing-down keywords from among the plurality of candidates for the narrowing-down keywords; however, the narrowing-down keywords may be selected using the associative dictionary.

In general, when the user selects the related keywords such as the narrowing-down keyword and the expansion keyword, the related keyword highly relevant to the search keyword is selected. However, when each document space of the document space database 103 is generated using the LSI, there is a possibility that a candidate with low relevance is included in the candidates for the narrowing-down keywords specified by the related keyword estimation unit 108. Accordingly, even if the narrowing-down keywords having low relevance with the search keyword is presented, there is a low possibility that the narrowing-down keyword is selected.

Accordingly, in order to prevent the narrowing-down keywords with low relevance from being presented, the related keyword estimation unit 108 generates an associative dictionary indicating the relevance between the keywords constituting the document space, and selects the narrowing-down keyword that should be displayed out of the candidates for the narrowing-down keywords using the associative dictionary.

The associative dictionary is automatically generated with a method shown in "Natural Language Processing" (pp. 387-392, Iwanami Shoten, 1996) (Non-patent reference 3). Alternatively, the associative dictionary may be generated by the designer in advance.

FIG. 14 is a diagram showing an example of the associative dictionary.

The associative dictionary is configured with a matrix as shown in FIG. 14, and shows the degree of relevance between the keywords.

The related keyword estimation unit 108 selects a few narrowing-down keywords that should be displayed out of the plurality of specified candidates for the narrowing-down keywords, using the associative dictionary.

For example, the input determining unit 101 receives the keyword of the keyword ID "KW2" as the search keyword, and the keywords of the keyword IDs "KW3, KW4, and KW5" are respectively specified as the candidates for the narrowing-down keywords. Furthermore, the related keyword estimation unit 108 determines the number of narrowing-down display "2" based on the display ratio output from the related keyword generation ratio determining unit 106.

In this case, the related keyword estimation unit 108 refers to the association values (0.4, 0.7, 0.8) of the candidates (the keyword IDs=KW3, KW4, and KW5) for the narrowing-down keywords for the search keyword in the associative dictionary shown in FIG. 14. Subsequently, the related keyword estimation unit 108 selects two candidates in the order of larger association value, out of the three candidates for the narrowing-down keywords, as the narrowing-down keywords that should be displayed. More specifically, the keywords of the keyword IDs "KW4 and KW5" are selected as the narrowing-down keywords.

This prevents the candidates having low relevance with the search keyword from being displayed as the narrowing-down keyword. This consequently allows reduction of the number of search step that increases due to repeated search performed when the user cannot find the desired narrowing-down keyword.

Furthermore, the related keyword estimation unit 108 may select the expansion keyword that should be displayed using the associative dictionary as described above, when selecting an expansion keyword that should be displayed among the candidates for the expansion keywords. This allows further reduction in the number of search steps that increases due to repeated search performed when the user cannot find the desired expansion keyword.

Furthermore, in this embodiment, the related keyword estimation unit 108 outputs the keyword IDs of the plurality of selected related keywords to the output generating unit 110; however, the related keyword estimation unit 108 may generate a new bound related keyword from the plurality of selected related keywords, and cause the output unit 111 to display the bound related keyword via the output generating unit 110.

For example, when the related keyword estimation unit 108 selects two narrowing-down keywords, the related keyword estimation unit 108 determines whether or not the number of contents is equal to or more than the threshold, in the groups of contents respectively corresponding to the two narrowing-down keywords. When the result shows the number of the contents is equal to or more than the threshold, the related keyword estimation unit 108 generates the bound related keyword by binding the two narrowing-down keywords, and displays the bound related keywords on the narrowing-down list L2. Furthermore, as described above, when the related keyword estimation unit 108 selects two expansion keywords, the related keyword estimation unit 108 determines whether or not the number of contents is equal to or more than the threshold, in the groups of contents respectively corresponding to the two expansion keywords. When the result shows the number of the contents is equal to or more than the threshold, the related keyword estimation unit 108 generates the bound related keyword by binding the two expansion keywords, and displays the bound related keywords on the expansion list L2.

This facilitates the user's selection of the desired related keyword, since the two related keywords with which similar search results are expected are bound and displayed as one keyword, which eliminates the user's hesitation on selecting which related keywords to select.

The contents retrieval device according to the present invention can be applied as a retrieval device which retrieves the contents that the user wishes to view, from among the large amount of contents stored in the server and others. For example, the contents retrieval device is applicable to a DVD (Digital Versatile Disk) player incorporated with a hard disk as shown in FIG. 15 and a device which reproduces a program, such as a player. The contents are, for example, the contents for viewing, such as television programs, movies, and music, and the text contents such as books and articles, and may be any data as long as it is data having text information as an attribute of the contents, regardless of the type.

The invention claimed is:

1. A contents retrieval device which displays a related keyword that is related to a search keyword for retrieving contents of a plurality of contents stored in a contents database, each content of the plurality of contents being stored in the contents database with a plurality of candidate keywords, said contents retrieval device comprising:

a keyword acquisition unit configured to acquire the search keyword;

a content retrieval unit configured to retrieve the contents of the plurality of contents, from the contents database, according to the acquired search keyword;

a document space storage unit including a memory in which a plurality of items of document space information are stored, each respective item of the plurality of items of document space information indicating a degree of relevance between (i) each content of the plurality of contents stored in the contents database and (ii) respective candidate keywords of the plurality of candidate keywords, each respective candidate keyword of the plurality of candidate keywords being categorized and associated with a respective item of the plurality of items of document space information according to a respective keyword occurrence frequency of the respective candidate keyword, the respective keyword occurrence frequency indicating, for the respective candidate keyword, a number of contents of the plurality of contents in which the respective candidate keyword appears, and the plurality of items of document space information including first document information being associated with a respective keyword occurrence frequency and the respective keyword occurrence frequency associated with the first document information indicating a degree of relevance between the search keyword and each of the plurality of contents;

a document space selection unit configured to select, from among the plurality of items of the document space information, (i) one item of the document space information, as second document space information, the second document space information being associated with a respective keyword occurrence frequency that is less than the respective keyword occurrence frequency associated with the first document space information, and the second document space information being associated with a respective candidate keyword, of the plurality of candidate keywords, that narrows down a number of contents, of the plurality of contents, to be retrieved by said content retrieval unit, and (ii) one item of the document space information, as third document space information, the third document space information being associated with a respective keyword occurrence frequency that is greater than the respective keyword occurrence frequency associated with the first document space information, and the third document space information being associated with a respective candidate keyword, of the plurality of candidate keywords, that expands a number of contents, of the plurality of contents, to be retrieved by said content retrieval unit; and a display unit configured to display, as the related keyword, each candidate keyword of the plurality of candidate keywords that satisfies a predetermined standard in the second document space information and the third document space information selected by said document space selection unit.

2. The contents retrieval device according to claim 1, wherein said document space selection unit includes a first document space selection unit configured to select, as narrowing-down document space information, the second document space information associated with the respective keyword occurrence frequency that is less than the respective keyword occurrence frequency associated with the first document space information, the narrowing-down document space information being selected from said document space storage unit, and wherein said display unit is configured to display, as the related keyword, a candidate keyword that satisfies the predetermined standard in the narrowing-down space information.

3. The contents retrieval device according to claim 2, wherein said document space selection unit includes a second document space selection unit configured to select, as expansion document space information, the third document space information associated with the respective keyword occurrence frequency that is greater than the respective keyword occurrence frequency associated with relevant to the first document space information, the expansion document space information being selected from said document space storage unit, and wherein said display unit is configured to display, as the related keyword, (i) a narrowing-down keyword that is the candidate keyword that satisfies the predetermined standard in the narrowing-down document space information and (ii) an expansion keyword that is a candidate keyword that satisfies the predetermined standard in the expansion document space information.

4. The contents retrieval device according to claim 3, further comprising a related keyword selection unit configured to select, from the contents database, the narrowing-down keyword and the expansion keyword, respectively corresponding to the narrowing-down document space information and the expansion document space information, such that a candidate keyword indicating a larger degree of relevance to the contents retrieved by said content retrieval unit is more likely to be selected by said related keyword selection unit, wherein said display unit is configured to display, as the related keyword, the narrowing-down keyword and the expansion keyword, and to display an attribute of the contents retrieved by said content retrieval unit.

5. The contents retrieval device according to claim 4, wherein said document space storage unit is configured to store a respective item of the plurality of items of document space information for each section of the plurality of candidate keywords categorized using a DF (Document Frequency) value as the respective keyword occurrence frequency.

6. The contents retrieval device according to claim 4, wherein said content retrieval unit is configured to determine that a narrowing-down search is to be performed when said keyword acquisition unit acquires the narrowing-down keyword as the search keyword by a user's selection of the narrowing-down keyword displayed by said display unit, and to retrieve the contents according to the search keyword and other search keywords acquired, by said keyword acquisition unit before the search keyword.

7. The contents retrieval device according to claim 6, wherein said content retrieval unit is configured to determine that an expansion search is to be performed when said keyword acquisition unit acquires the expansion keyword as the search keyword by the user's selection of the expansion keyword displayed by said display unit, and to retrieve the contents according to the search keyword and the other search keywords acquired, by said keyword acquisition unit before the search keyword.

8. The contents retrieval device according to claim 7, further comprising:
a search condition determining unit configured to determine (i) that the narrowing-down search is performed by said content retrieval unit when said keyword acquisition unit acquires the narrowing-down keyword by the user's selection of the narrowing-down keyword displayed by said display unit, and (ii) that the expansion search should be performed, when said keyword acquisition unit acquires the expansion keyword as the search keyword by the user's selection of the expansion keyword displayed by said display unit, and to retrieve the contents according to the search keyword and the other search keywords acquired, by said keyword acquisition unit, before the search keyword; and
a ratio determining unit configured to determine a ratio of a number of the narrowing-down keywords and a number of the expansion keywords to be displayed by said display unit, according to a result determined by said search condition determining unit,
wherein said related keyword selection unit is configured to select the narrowing-down keyword and the expansion keyword according to the ratio determined by said ratio determining unit.

9. The contents retrieval device according to claim 8, wherein said ratio determining unit is configured to determine a ratio where the number of the narrowing-down keywords is larger than the number of the expansion keywords, when said search condition determining unit determines that the narrowing-down search is performed.

10. The contents retrieval device according to claim 8, wherein said ratio determining unit is configured to determine a ratio where the number of the expansion keywords is larger than the number of the narrowing-down keywords, when said search condition determining unit determines that the expansion search is performed.

11. The contents retrieval device according to claim 4, wherein said content retrieval unit is configured to (i) determine whether or not a number of overlapping contents between (a) a group of contents, of the plurality of contents, according to the search keyword and (b) a group of contents, of the plurality of contents, according to another keyword acquired, by said keyword acquisition unit, before the search keyword, is equal to or more than a threshold, (ii) retrieve the contents according to the search keyword and the other keyword, when said content retrieval unit determines that the number of overlapping contents is equal to or more than the threshold, and (iii) retrieve the contents only according to the search keyword, when said content retrieval unit determines that the number of overlapping contents is less then the threshold.

12. The contents retrieval device according to claim 11, wherein said related keyword selection unit is configured to select, as the narrowing-down keyword or the expansion keyword, a candidate keyword indicating a degree of relevance equal to or more than the threshold.

13. The contents retrieval device according to claim 11, wherein said related keyword selection unit is configured to generate a bound related keyword by binding the narrowing-down keywords or the expansion keywords, when said related keyword selection unit selects the narrowing-down keywords or the expansion keywords, and when the number of overlapping contents is equal to or more than the threshold, and
wherein said display unit is configured to display the bound related keyword instead of the narrowing-down keywords and the expansion keywords.

14. The contents retrieval device according to claim 4, wherein, using an associative dictionary indicating a large degree of relevance to the contents retrieved by said content retrieval unit and indicating relevance between each candidate keyword, said related keyword selection unit is configured to select, from the contents database, the narrowing-down keyword and the expansion keyword, respectively corresponding to the narrowing-down document space information and the expansion document space information, such that a candidate keyword indicating a larger relevance with the search keyword is more likely to be selected by said related keyword selection unit.

15. A contents retrieval method of using a contents retrieval device to display a related keyword that is related to a search keyword for retrieving contents of a plurality of contents stored in a contents database, each content of the plurality of contents being stored in the contents database with a plurality of candidate keywords, said contents retrieval method including:
acquiring the search keyword;
retrieving the contents of the plurality of contents, from the contents database, according to the acquired search keyword;
using a document space storage unit of the contents retrieval device to store a plurality of items of document space information in a memory, each respective item of the plurality of items of document space information indicating a degree of relevance between (i) each content of the plurality of contents stored in the contents database and (ii) respective candidate keywords of the plurality of candidate keywords, each respective candidate keyword of the plurality of candidate keywords being categorized and associated with a respective item of the plurality of items of document space information according to a respective keyword occurrence frequency of the respective candidate keyword, the respective keyword occurrence frequency indicating, for the respective candidate keyword, a number of contents of the plurality of contents in which the respective candidate keyword, and the plurality of items of document space information including first document information being associated with a respective keyword occurrence frequency and the respective keyword occurrence frequency associated with the first document information indicating a degree of relevance between the search keyword and each of the plurality of contents;
selecting, from among the plurality of items of document space information, (i) one item of the document space information, as second document space information, the second document space information being associated with a respective keyword occurrence frequency that is less than the respective keyword occurrence frequency associated with the first document space information, and the second document space information being associated with a respective candidate keyword, of the plurality of candidate keywords, that narrows down a number of contents, of the plurality of contents, to be retrieved by said retrieving of the contents, and (ii) one item of the document space information, as third document space information, the third document space information being associated with a respective keyword occurrence frequency that is greater than the respective keyword occurrence frequency associated with the first document space information, and the third document space information being associated with a respective candidate keyword, of the plurality of candidate keywords, that expands a number of contents, of the plurality of contents, to be retrieved by said retrieving of the contents; and displaying, as the related keyword, each candidate keyword of the plurality of candidate keywords that satisfies a predetermined standard in the second document space information and the third document space information selected by said selecting.

16. A non-transitory computer-readable recording medium having a program recorded thereon, the program for displaying a related keyword that is related to a search keyword for retrieving contents of a plurality of contents stored in a contents database, each content of the plurality of contents being stored in the contents database with a plurality of candidate keywords, the program causing a computer to execute a method comprising:

acquiring the search keyword;

retrieving the contents of the plurality of contents, from the contents database, according to the acquired search keyword;

using a document space storage unit of the contents retrieval device to store a plurality of items of document space information in a memory, each respective item of the plurality of items of the document space information indicating a degree of relevance between (i) each content of the plurality of contents stored in the contents database and (ii) respective candidate keywords of the plurality of candidate keywords, each respective candidate keyword of the plurality of candidate keywords being categorized and associated with a respective item of the plurality of items of document space information according to a respective keyword occurrence frequency of the respective candidate keyword, the respective keyword occurrence frequency indicating, for the respective candidate keyword, a number of contents of the plurality of contents in which the respective candidate keyword appears, and the plurality of items of document space information including first document information being associated with a respective keyword occurrence frequency and the respective keyword occurrence frequency associated with the first document information indicating a degree of relevance between the search keyword and each of the plurality of contents;

selecting, from among the plurality of items of document space information, (i) one item of the document space information, as second document space information, the second document space information being associated with a respective keyword occurrence frequency that is less than the respective keyword occurrence frequency associated with the first document space information, and the second document space information being associated with a respective candidate keyword, of the plurality of candidate keywords, that narrows down a number of contents, of the plurality of contents, to be retrieved by said retrieving of the contents, and (ii) one item of the document space information, as third document space information, the third document space information being associated with a respective keyword occurrence frequency that is greater than the respective keyword occurrence frequency associated with the first document space information, and the third document space information being associated with a respective candidate keyword, of the plurality of candidate keywords, that expands a number of contents, of the plurality of contents, to be retrieved by said retrieving of the contents; and displaying, as the related keyword, each candidate keyword of the plurality of candidate keywords that satisfies a predetermined standard in the second document space information and the third document space information selected by said selecting.

17. A contents retrieval device which displays a related keyword that is related to a search keyword for retrieving contents of a plurality of contents stored in a contents database, each content of the plurality of contents being stored in the contents database with a plurality of candidate keywords, said contents retrieval device comprising:

a keyword acquisition unit configured to acquire the search keyword;

a content retrieval unit configured to retrieve the contents of the plurality of contents, from the contents database, according to the acquired search keyword;

a document space storage unit including a memory in which a plurality of items of document space information are stored, each respective item of the plurality of items of document space information indicating a degree of relevance between (i) each content of the plurality of contents stored in the contents database and (ii) respective candidate keywords of the plurality of candidate keywords, each respective candidate keyword of the plurality of candidate keywords being categorized and associated with a respective item of the plurality of items of document space information according to a respective keyword occurrence frequency of the respective candidate keyword, the respective keyword occurrence frequency indicating, for the respective candidate keyword, a number of contents of the plurality of contents in which the respective candidate keyword appears, and the plurality of items of document space information including first document information being associated with a respective keyword occurrence frequency and the respective keyword occurrence frequency associated with the first document information indicating a degree of relevance between the search keyword and each of the plurality of contents; and a document space selection unit configured to select, from among the plurality of items of the document space information, (i) one item of the document space information, as second document space information, the second document space information being associated with a respective keyword occurrence frequency that is less than the respective keyword occurrence frequency associated with the first document space information, and the second document space information being associated with a respective candidate keyword, of the plurality of candidate keywords, that narrows down a number of contents, of the plurality of contents, to be retrieved by said content retrieval unit, and (ii) one item of the document space information, as third document space information, the third document space information being associated with a respective keyword occurrence frequency that is greater than the respective keyword occurrence frequency associated with the first document space information, and the third document space information being associated with a respective candidate keyword, of the plurality of candidate keywords, that expands a number of contents, of the plurality of contents, to be retrieved by said content retrieval unit.

* * * * *